(12) United States Patent
Liu et al.

(10) Patent No.: US 11,687,311 B2
(45) Date of Patent: Jun. 27, 2023

(54) SCREEN PROJECTION PROCESSING METHOD AND DEVICE

(71) Applicant: Lenovo (Beijing) Limited, Beijing (CN)

(72) Inventors: Xiao Liu, Beijing (CN); Wei Zheng, Beijing (CN); Li Liu, Beijing (CN); Yanan Tian, Beijing (CN); Longfei Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 22 days.

(21) Appl. No.: 17/381,619

(22) Filed: Jul. 21, 2021

(65) Prior Publication Data

US 2022/0027117 A1 Jan. 27, 2022

(30) Foreign Application Priority Data

Jul. 21, 2020 (CN) .......................... 202010704753.6

(51) Int. Cl.
 *G06F 3/14* (2006.01)
 *G06F 3/048* (2013.01)
 *G06F 9/451* (2018.01)
 *G06F 3/0482* (2013.01)

(52) U.S. Cl.
 CPC .......... *G06F 3/1454* (2013.01); *G06F 3/0482* (2013.01); *G06F 9/451* (2018.02)

(58) Field of Classification Search
 CPC ...... G06F 3/1454; G06F 3/0482; G06F 9/451; G06F 3/0481; G06F 3/0483; G06F 3/1423; G06F 9/449; G09G 5/14; G09G 2354/00
 See application file for complete search history.

(56) References Cited

U.S. PATENT DOCUMENTS

| | | | | |
|---|---|---|---|---|
| 9,438,872 B2 * | 9/2016 | Lin | ..................... | H04N 9/3194 |
| 10,241,739 B2 * | 3/2019 | Sugaya | .............. | H04N 21/4122 |
| 10,346,014 B2 * | 7/2019 | Knoppert | .............. | G06F 3/1423 |
| 10,455,119 B2 * | 10/2019 | Morikawa | ............ | H04N 9/3194 |
| 10,503,459 B2 * | 12/2019 | Lim | ................. | H04N 21/43637 |
| 11,262,968 B2 * | 3/2022 | Tian | ....................... | G06F 3/1454 |
| 2008/0068290 A1 * | 3/2008 | Muklashy | ................ | G09G 5/14 |
| | | | | 345/2.1 |

FOREIGN PATENT DOCUMENTS

CN 111324327 A 6/2020

OTHER PUBLICATIONS

CN111324327A, English Translation, Zhou et al, Screen projection method and terminal equipment, Jun. 23, 2020, Huawei Tech Co Ltd, pp. 1-54 (Year: 2020).*

* cited by examiner

*Primary Examiner* — Vijay Shankar
(74) *Attorney, Agent, or Firm* — Anova Law Group, PLLC

(57) ABSTRACT

A screen projection processing method includes obtaining an operation for a first electronic device, responding to the operation by calling a task manager of the first electronic device to display a plurality of application objects managed by the task manager in a display area of the first electronic device, determining a first application object from the plurality of application objects, and projecting a first display content generated by an application program corresponding to the first application object in an operative state to a second display area of a second electronic device in real-time.

19 Claims, 15 Drawing Sheets

SCREEN PROJECTION PROCESSING METHOD AND DEVICE

CROSS-REFERENCE TO RELATED APPLICATION

This application claims priority to Chinese Patent Application No. 202010704753.6, filed on Jul. 21, 2020, the entire content of which is incorporated herein by reference.

TECHNICAL FIELD

The present disclosure generally relates to the data processing technology field and, more particularly, to a screen projection processing method and a device.

BACKGROUND

The current screen projection technology can enlarge a display area of an electronic device. For example, if a first electronic device is connected to a second electronic device, and a screen of the first electronic device is smaller than a screen of the second electronic device, the content displayed in the display area of the first electronic device is projected to the display area of the second electronic device for display. Thus, the display area of the second electronic device is used as a display area of the first electronic device. Therefore, the display area of the first electronic device is expanded.

SUMMARY

Embodiments of the present disclosure provide a screen projection processing method. The method includes obtaining an operation for a first electronic device, responding to the operation by calling a task manager of the first electronic device to display a plurality of application objects managed by the task manager in a display area of the first electronic device, determining a first application object from the plurality of application objects, and projecting a first display content generated by an application program corresponding to the first application object in an operative state to a second display area of a second electronic device in real-time.

Embodiments of the present disclosure provide a projection processing device including a processor and a storage medium. The storage medium stores computer program codes that, when executed, cause the processor to obtain an operation for a first electronic device, respond to the operation by calling a task manager of the first electronic device, display a plurality of application objects managed by the task manager in a display area of the first electronic device, determine a first application object from the plurality of application objects, and project a first display content generated by an application program corresponding to the first application object in an operative state to a second display area of a second electronic device in real-time.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

To make purposes, technical solutions, and advantages of embodiments of the present disclosure clearer, the technical solutions of embodiments of the present disclosure are described in detail in connection with the accompanying drawings below. Described embodiments are merely some embodiments of the present disclosure but not all embodiments. Based on embodiments of the present disclosure, all other embodiments obtained by those of ordinary skill in the art without creative effort should be within the scope of the present disclosure.

Figure 1:
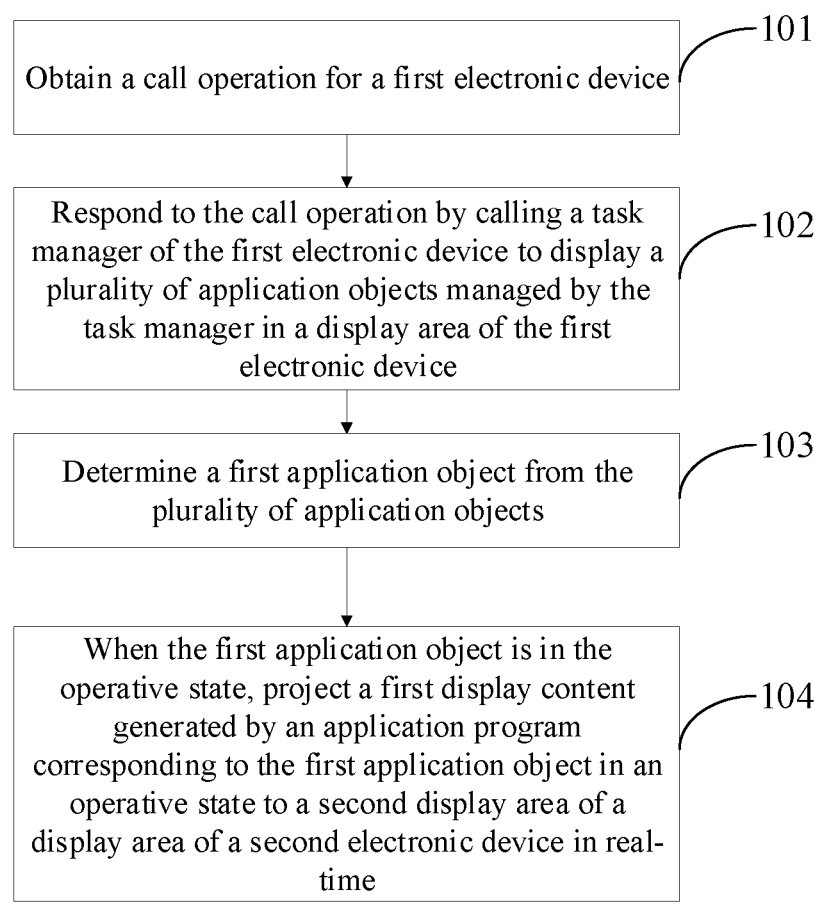
FIG. 1 illustrates a schematic flowchart of a screen projection processing method according to some embodiments of the present disclosure.

FIG. 1 illustrates a schematic flowchart of a screen projection processing method according to some embodiments of the present disclosure. The method includes the following processes.

At 101, the first electronic device obtains a call operation (the call operation also referred to as an operation in this specification) for a first electronic device.

At 102, the first electronic device responds to the call operation to call a task manager of the first electronic device to display a plurality of application objects managed by the task manager in a display area of the first electronic device.

The call operation may include a function of calling the task manager. The task manager may be called when the first electronic device obtains the call operation for the first electronic device. The call operation may include at least one of a gesture operation for the first electronic device or an operation for a component of the first electronic device. For example, the call operation may include a slide operation (e.g., slide upward) for the display area of the first electronic device. For another example, the call operation may include a double click operation for a home key of the first electronic device.

If an upward slide operation is used as the call operation, an operation body may contact the display area of the first electronic device and move upward. The operation body may refer to a user that can operate the electrical devices, or a device that can be used to operate the electrical devices. Thus, the first electronic device may determine to obtain the upward slide operation used as the call operation. Under this situation, the first electronic device may call the task manager of the first electronic device. That is, during a process of the operation body contacting the display area of the first electronic device, the first electronic device may continuously detect a down event, a move event with a direction of the move event that is upward, and an up event. Thus, the first electronic device may determine to obtain the upward slide operation.

In some embodiments, the call operation may take effect when the first electronic device is in an unlock status. That is, when the first electronic device is in the unlock status, and if the first electronic device obtains the call operation, the first electronic device may respond to the call operation. If the first electronic device is in a sleeping status, the operation body may perform the call operation on the first electronic device. However, the first electronic device may not obtain the call operation, and the call operation thus may not take effect. The call operation may generally take effect when the first electronic device is in the unlock status. In some embodiments, the call operation may be set to take effect when the first electronic device is in a lock status. As such, the first electronic device may respond to the call operation even an unlock operation is not performed on the first electronic device. The unlock status may refer to that the screen of the first electronic device may be lighted up, and the application objects of the first electronic device may be applicable. The lock status may refer to that the screen of the first electronic device may be lighted up, but the application objects of the first electronic device may be forbidden for use or merely a few application objects (e.g., camera) may be applicable. The sleeping status may refer to that the first electronic device may have a black screen.

If the first electronic device calls the task manager of the first electronic device, the first electronic device displays the plurality of application objects of the task manager in the display area of the first electronic device. The task manager may be used as an entrance for expansion and projection. The first electronic device may project display content of at least one of the plurality of application objects to a second electronic device for display. The plurality of application objects of the task manager may include application objects used by the first electronic device in a predetermined period. The application objects may include at least one type of application object that has been closed, has been used and switched to background operation, or is currently in operation. The predetermined period may start from when the first electronic device responds to the call operation for a certain time. Embodiments of the present disclosure do not limit the predetermined period.

Figure 2:
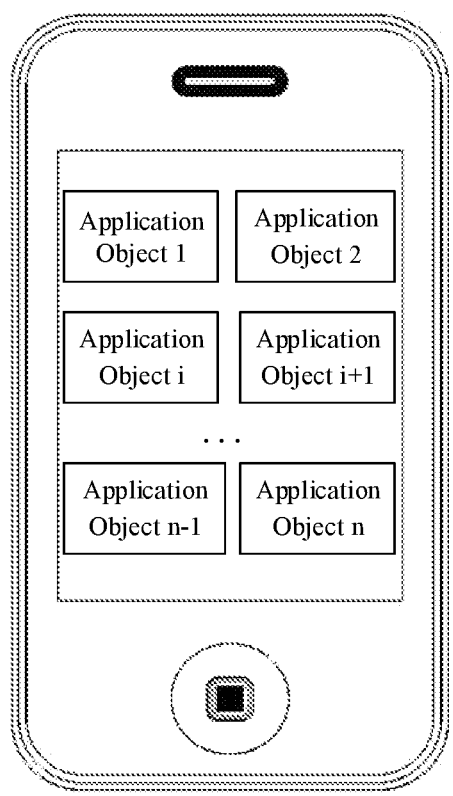
FIG. 2 illustrates a schematic diagram displaying a plurality of application objects according to some embodiments of the present disclosure.
Figure 3:
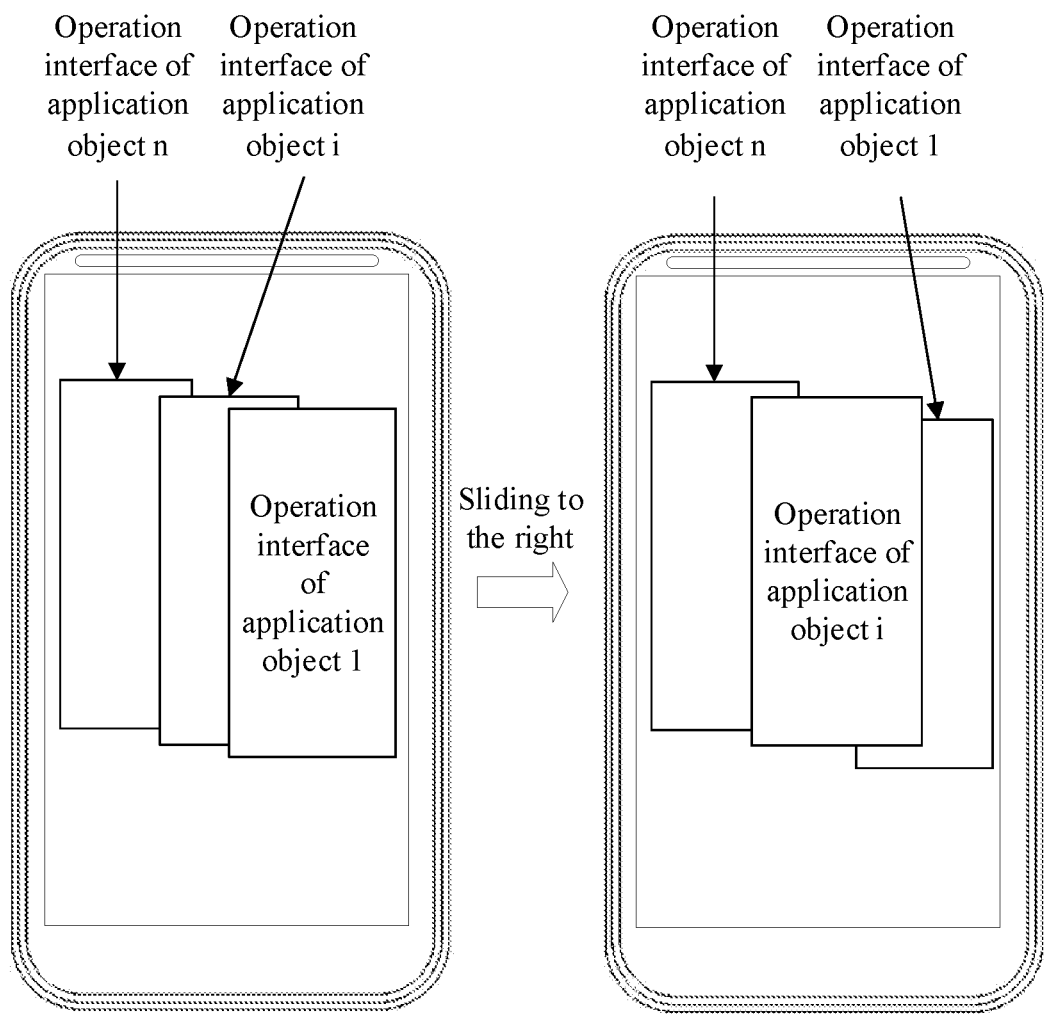
FIG. 3 illustrates a schematic diagram displaying a plurality of application objects according to some other embodiments of the present disclosure.

A manner of displaying the plurality of application objects in the display area of the first electronic device may include displaying identifications of the plurality of application objects in the display area. For example, the first electronic device may display thumbnails of the plurality of application objects in the display area or operation interfaces of the plurality of application objects. During displaying the plurality of application objects, the first electronic device may display the thumbnails of the plurality of application objects simultaneously in the display area of the first electronic device. As shown in FIG. 2, when obtaining the upward slide operation, the first electronic device displaying the thumbnails of the plurality of application objects of the task manager in the display area of the first electronic device. In some other embodiments, the double click operation may be performed on the home key, the first electronic device may display the operation interfaces of the plurality of application objects of the task manager in the display area of the first electronic device. As shown in FIG. 3, the first electronic device may display the operation interfaces of the plurality of application objects in a stacked manner. A first application object that is displayed may be in a projection allowed status. Other application objects may be in a projection forbidden status. The application object displayed in the display area may be switched by sliding to the left and sliding to the right. Thus, the different application objects may be switched from the projection forbidden status to the projection allowed status. Correspondingly, the application object in the projection allowed status may be switched to the projection forbidden status.

Figure 4:
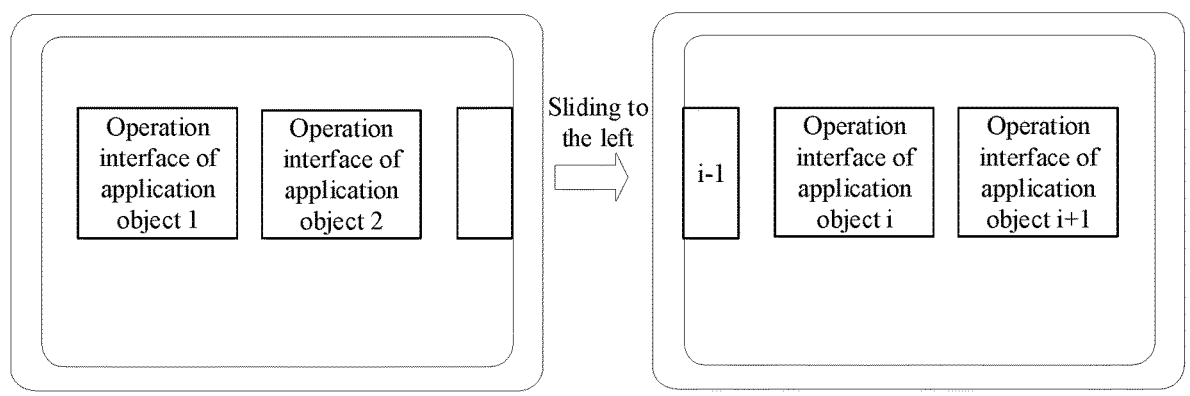
FIG. 4 illustrates a schematic diagram displaying a plurality of application objects according to some other embodiments of the present disclosure.

In addition to the display manner shown in FIG. 3, embodiments of the present disclosure include another display manner of displaying the plurality of application objects of the task manager. As shown in FIG. 4, the first electronic device displays the operation interfaces of the plurality of application objects in a tiled manner. The tiled manner may refer to that the first electronic device may display the operation interfaces of at least one application object in the display area of the first electronic device. However, the operation interfaces may match with each other and may not overlap with each other. The first electronic device may switch the operation interfaces of the application objects displayed in the display area through the sliding to the left and the sliding to the right.

At 103, the first electronic device determines a first application object from the plurality of application objects.

The first application object may include an application object of the plurality of application objects. The first electronic device may determine the first application object based on an operation of the operation body for the plurality of application objects. The first electronic device may select an application object from the plurality of application objects as the first application object through the operation. In some other embodiments, the first electronic device may determine the first application object automatically from the plurality of application objects. For example, the first electronic device may determine the first application object of the task manager as the first application object. For example, the first electronic device may obtain use data of each application object of the plurality of application objects of the task manager. Based on the use data of each application object, the first electronic device may determine the first application object from the plurality of application objects. The use data may at least indicate a use frequency of the application objects and/or a projected frequency of the application objects. Based on the use data, the first electronic device may select the first application object with the use frequency and/or the projected frequency matching a predetermined condition. For example, the predetermined condition may include the application object with the maximum use frequency or the use frequency greater than a certain threshold. The predetermined condition is not limited by embodiments of the present disclosure.

At 104, when the first application object is in the operation status, the first electronic device projects a first display content generated by an application program corresponding to the first application object in an operative state to a second display area of a display area of a second electronic device in real-time. Thus, the first electronic device projects the first display content of the first application object to the display area of the second electronic device.

In some embodiments, two projection modes may be included. In a first projection mode, the first electronic device may operate an application object corresponding to the first object. The display content displayed in the first electronic device may be synchronized in the second electronic device, that is, the first electronic device and the second electronic device may display the same display content. In a second projection mode, the first electronic device may operate the application object, and the display content may be displayed on the second electronic device, that is, the first electronic device and the second electronic device may not display the same display content. The first electronic device may be preset to use one of the projection modes as a default. In some embodiments, a user may select one of the projection modes The first display content may include the content displayed in real-time when the first application object is in the operative state. That is the content that may be displayed currently in the first electronic device when the first application object is displayed in the display area of the first electronic device. When the first electronic device is in the operative state, the status of the first application object in the second electronic device may be the same as the status of the first application object in the first electronic device. For example, the status of the first application object may include an operation phase of the first application object and a display picture in the operation phase. During a process of projecting the first application object in the display area of the second electronic device, the first application object may be directly operated to the operation phase where the first application object is in the first electronic device in the second electronic device, and the display picture in the operation phase may be displayed.

For example, the first application object may include a game application. The game application may be in a fighting mode when the game application enters a game phase in the first electronic device. When the first electronic device projects the game application in the display area of the second electronic device for display, the second electronic device may directly enter the game phase of the game application and display the interface of the fighting mode of the first electronic device. As such, if the first application object is in the operation status in the first electronic device, the first electronic device may transmit images of the first application status from the closed status to the current operation status to the second electronic device frame by frame. The second electronic device may load the images from the closed status to the current operation status to the display area of the second electronic device frame by frame. Thus, the second electronic device may display the first display content displayed in real-time when the first application object in the operation status.

If the first application object is in the closed status in the first electronic device, during projecting the first application object from the first electronic device to the second electronic device, the first electronic device may switch from the closed status to the operative state to synchronize the first display content displayed in real-time in the operative state to the second electronic device. Thus, a projection process may not only include a content projection function but also trigger the first application object to change to the operative state. Thus, the first application object may switch automatically from the closed status to the operative state.

Therefore, a start operation may not need to be executed for the first application object. For example, the first application object may include a chat application. The chat application is in the closed status on the first electronic device. When projecting the chat application in the display area of the second electronic device for display, the first electronic device may switch the chat application from the closed status to the operative state. That is, the first electronic device may start the chat application. The first electronic device may synchronize the display interface of the chat application that may be used as the first display content in the display area of the second electronic device for display. As such, the second electronic device may directly enter the chat application.

During projecting the first display content displayed in real-time when the first application object is in the operative state, the first electronic device may display a content displayed in real-time of another application object in the operative state in the first electronic device. The content displayed in the first electronic device and the content displayed in the second electronic device may be independent of each other. Thus, the application objects corresponding to the first electronic device and the second electronic device may not impact each other. For example, a user may play a game through the first electronic device and watch live broadcasting through the second electronic device. For another example, the user may chat through the first electronic device and watch a video through the second electronic device. For another example, the user may play a game through the first electronic device and perform away from the keyboard in the second electronic device. Thus, the first electronic device and the second electronic device may operate different application objects to satisfy different user needs.

In some embodiments, the another application object displayed in the first electronic device may include an application object determined from the desktop of the first electronic device. For example, the first electronic device may select the application object according to the selection operation of the operation body for the display area of the first electronic device. The another application object of the first electronic device may be determined in another manner, which is not repeated here.

The first electronic device and the second electronic device may be connected through at least one of a wired connection manner or a wireless connection manner. For example, the first electronic device and the second electronic device may be connected through a display port (DP) cable or a high-definition multimedia interface cable (HDMI). For another example, the first electronic device and the second electronic device may be connected to a same local area network (LAN). Because the stability of the wired connection manner is better than the wireless connection manner, the first electronic device and the second electronic device may be connected through the wired connection manner. If the first electronic device and the second electronic device are connected through the wired connection manner and the wireless connection manner simultaneously, data may be transmitted through the wired connection manner.

The relationship between the second electronic device and the first electronic device may include, but not limited to, as follows. The display area of the second electronic device may be larger than the display area of the first electronic device. Thus, the first electronic device may project the display content of the application object that requires the larger display area in the display area of the second electronic device. In addition, the second electronic device may include an electronic device having a display function but not a computation function. For example, the second electronic device may include a monitor. The second electronic device may not include an input element such as a mouse or a keyboard. The second electronic device may be controlled through the input element of the first electronic device. The first electronic device may also process computation required by control. The first electronic device may transmit the content displayed in real-time obtained after processing to the second electronic device.

The above screen projection processing method includes obtaining the call operation for the first electronic device, responding to the call operation to cal the task manager of the first electronic device to display the plurality of application objects managed by the task manager displayed in the display area of the first electronic device, determining the first application object from the plurality of application objects, and projecting the first display content generated by the application program corresponding to the first application object in the operative state to the second display area of the display area of the second electronic device in real-time for display. Thus, the task manager may be an entrance of expansion and projection. The first electronic device may select the first application object from the plurality of application objects managed by the task manager to be the application object for expansion and projection. Since a quantity of the application objects in the task manager is less than a quantity of the application objects on the desktop, the first electronic device may select the first application object from the plurality of application objects, and the quantity of the application objects that can be selected may be controlled to improve selection efficiency.

During the projection, the first electronic device may project the first display content generated by the application program corresponding to the first application object in the operative state to the second display area of the display area of the second electronic device in real-time for display. Thus, the first application object is in the operative state when the first electronic device projects the first application object to the second electronic device. As such, even the first application object is in the closed status in the first electronic device, the first electronic device may control the first application object to switch from the closed status to the operative state during the projection. If the first application object is in the operative state in the first electronic device, the first application object may maintain the operative state when being projected to the second electronic device. The content displayed may include the first display content displayed in real-time when the first application object is in the operative state. Thus, the status of the first application object in the second electronic device may be the same as the status of the first application object in the first electronic device. Some operations of the first application object may be saved in the second electronic device to speed up the operation of the first application object in the second electronic device.

Figure 5:
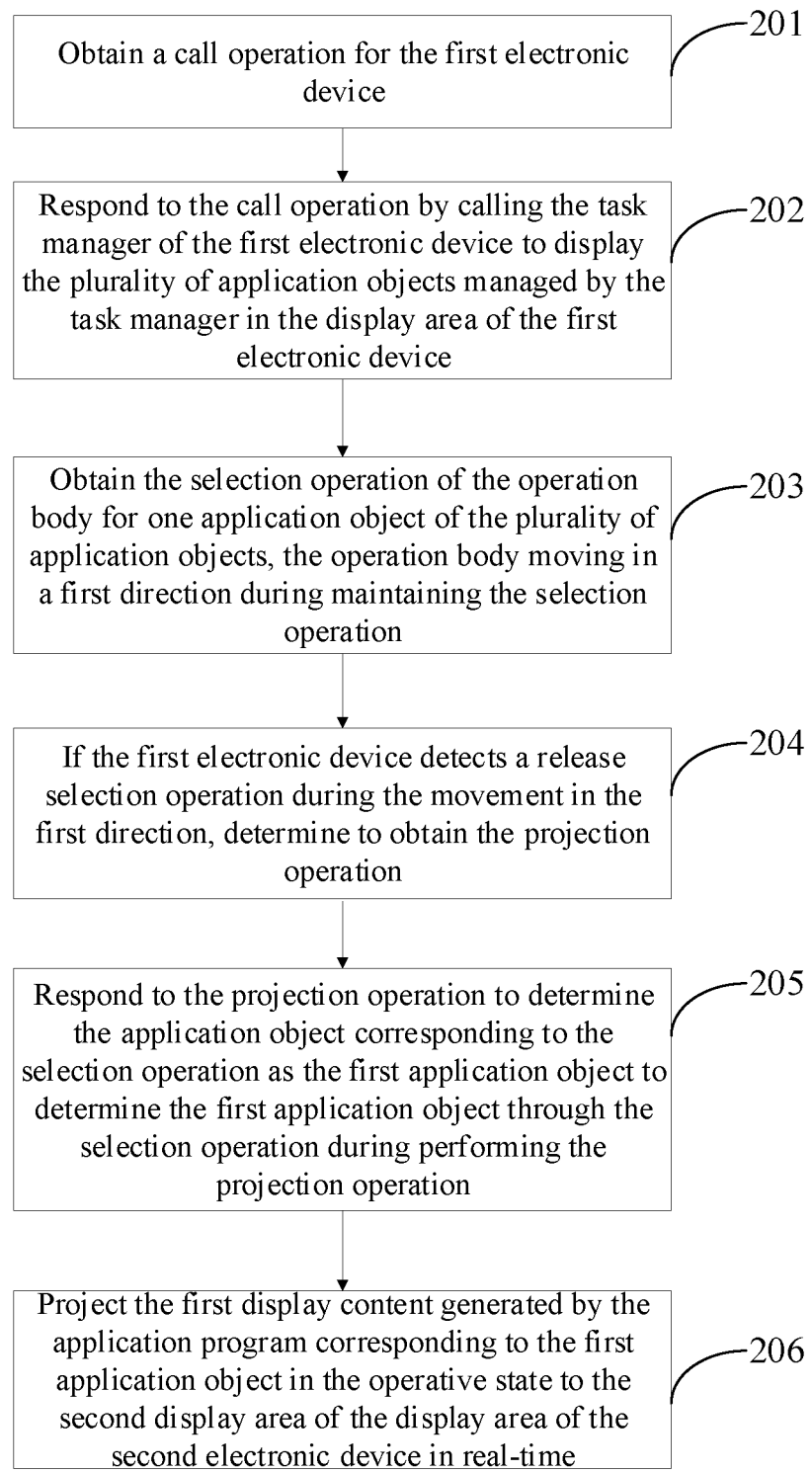
FIG. 5 illustrates a schematic flowchart of a screen projection processing method according to some other embodiments of the present disclosure.

FIG. 5 illustrates a schematic flowchart of a screen projection processing method according to some other embodiments of the present disclosure. The screen projection processing method may include the following processes.

At 201, the first electronic device obtains a call operation for the first electronic device.

At 202, the first electronic device responds to the call operation to call the task manager of the first electronic device to display the plurality of application objects managed by the task manager in the display area of the first electronic device.

In some embodiments, for the description of process 201 and process 202, reference may be made to the above description, which is not repeated here.

At 203, the first electronic device obtains the selection operation of the operation body for one application object of the plurality of application objects, and the operation body moves in a first direction during maintaining the selection operation.

The selection operation may be used to indicate that one application object of the plurality of application objects is selected. During maintaining a selected situation, the operation body may drag the selected application object to move in the first direction. Thus, the one application object of the plurality of application objects may be in a selected and dragged status.

The first direction may include a direction of left, right, up, and down. The display area of the first electronic device may currently display at least one application object of all the application objects managed by the task manager. The first electronic device may not select the one application object that is currently displayed to project to the second electronic device. When obtaining a switch operation for the display area of the first electronic device, the first electronic device may switch the application object displayed in the display area of the first electronic device. For example, after obtaining the slide operation for the display area of the first electronic device, the first electronic device may switch the application object displayed in the display area of the first electronic device. For example, sliding to the left and sliding to the right may both switch the application object displayed in the display area of the first electronic device. To distinguish from switching the application object, the first direction, to which the one application moves after being selected based on the selection operation, may be different from the sliding direction for switching the application object. For example, the first direction may include upward or downward.

At 204, if the first electronic device detects a release selection operation during the movement in the first direction, the first electronic device determines to obtain the projection operation. The release selection operation may indicate that the selection operation ends. From detecting the selection operation to dragging the one application object to move in the first direction and to ending the selection operation, a projection operation may be completed. For the first electronic device, when detecting the down event, the move event with the direction of the move event that is the first direction, and the up event, the first electronic device may determine to obtain the projection operation.

205, the first electronic device responds to the projection operation to determine the application object corresponding to the selection operation as the first application object to determine the first application object through the selection operation during performing the projection operation.

At 206, the first electronic device projects the first display content generated by the application program corresponding to the first application object in the operative state to the second display area of the display area of the second electronic device in real-time.

In some embodiments, the projection operation may be used to determine the first application object from the plurality of application objects and instruct the first electronic device to synchronize the first display content in the display area of the second electronic device for display. Thus, the projection operation may include functions of determining the first application object, determining the first display content, and synchronizing the first display content to the second electronic device to complete a plurality of tasks through the projection operation.

Figure 6:
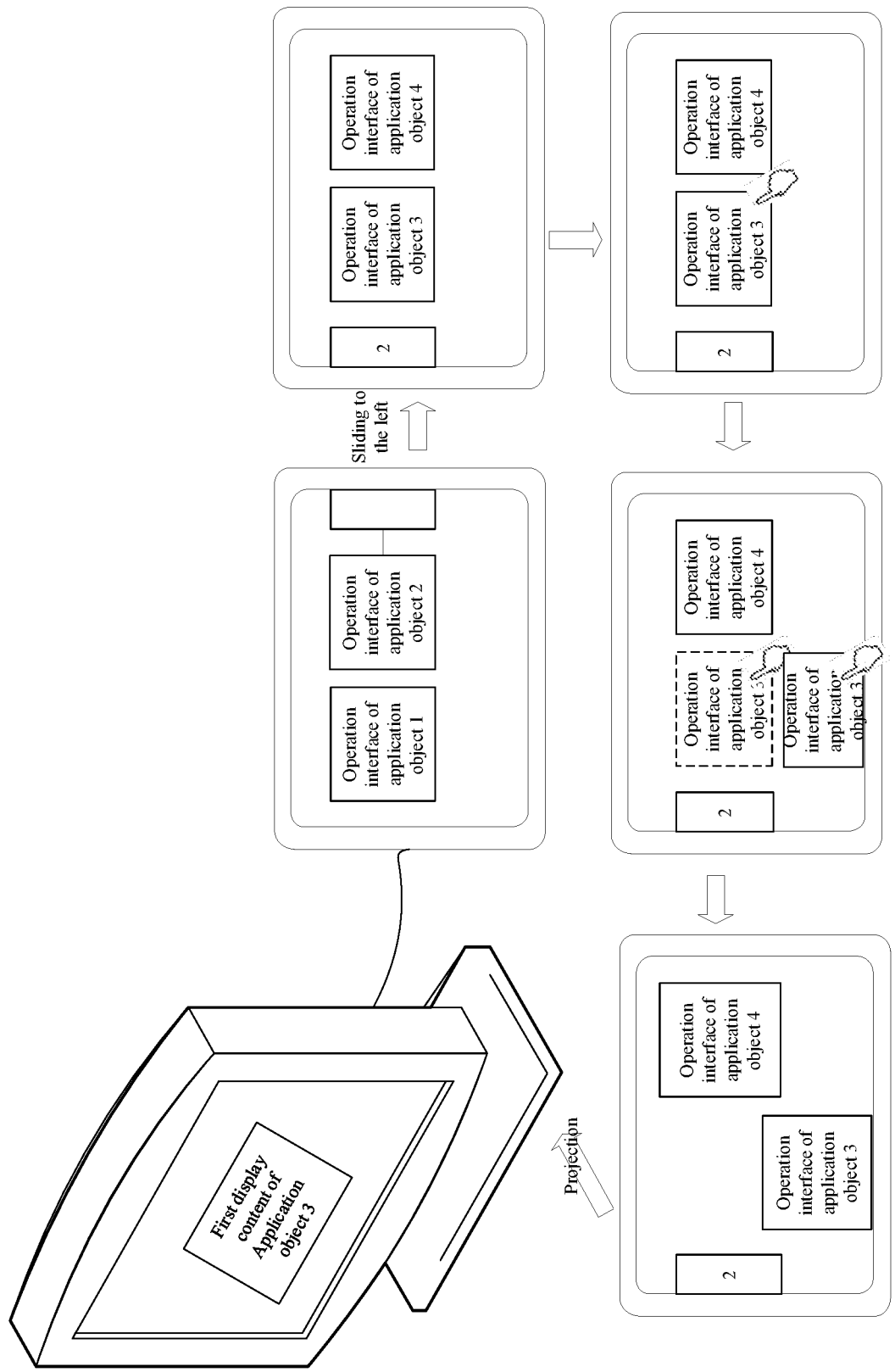
FIG. 6 illustrates a schematic diagram showing selecting a first application object for display through a projection operation according to some embodiments of the present disclosure.

As shown in FIG. 6, after the first electronic device calls the task manager, the display area of the first electronic device may display application object 1 of the plurality of application objects managed by the task manager. The first electronic device may switch application object 1 to application object 3 for display through the sliding to the left. Application object 1 may switch from the projection allowed status to the projection forbidden status. Application object 3 may switch from the projection forbidden status to the projection allowed status. If the first electronic device obtains the selection operation for application object 3, the current operation body may select application object 3. During maintaining the selection of application object 3, the first electronic device may detect that the operation body may move downward. If the first electronic device detects that the selection operation ends during the downward movement, the first electronic device may determine to obtain the projection operation. The first electronic device may synchronize the first display content displayed in real-time when application object 3 in the operation status to the second electronic device.

If detecting the upward movement aft the downward movement and detecting that the selection operation ends after detecting the upward movement, the first electronic device may determine to not obtain the projection operation. The first electronic device may not determine application object 3 as the first application object and further, may not synchronize the display content corresponding to application object 3 to the second electronic device. However, if detecting the downward movement after the upward movement after the downward movement, and detecting that the selection operation ends after the downward movement, the first electronic device may determine to obtain the projection operation. Thus, in some embodiments, the first electronic device may determine to obtain the projection operation when detecting that the selection operation ends during the downward movement.

In the screen projection processing method, from detecting selection operation to dragging the one application object to move in the first direction and to ending the selection operation, a projection operation may be completed. The screen projection processing method includes responding to the projection operation to determine the first application object from the plurality of application objects and instruct the first electronic device to synchronize and display the first display content in the display area of the second electronic device. Thus, the projection operation may include the functions of determining the first application object, determining the first display content, and synchronizing the first display content to the second electronic device to complete the plurality of tasks through the projection operation.

Figure 7:
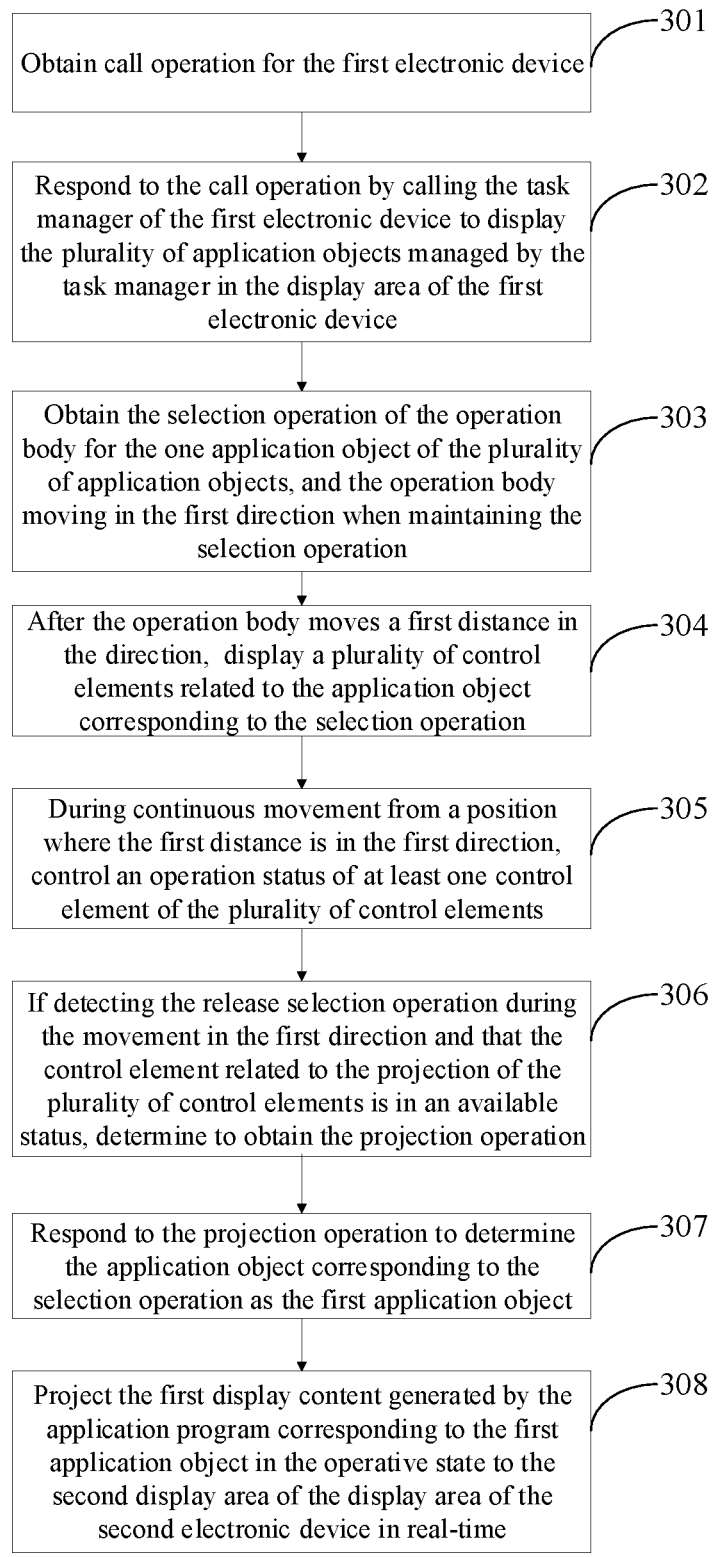
FIG. 7 illustrates a schematic flowchart of a screen projection processing method according to some other embodiments of the present disclosure.

In some embodiments, for a method of determining to obtain the projection operation, reference may be made to the screen projection processing method shown in FIG. 7. The method includes the following processes.

At 301, the first electronic device obtains a call operation for the first electronic device.

At 302, the first electronic device responds to the call operation to call the task manager of the first electronic device to display the plurality of application objects managed by the task manager in the display area of the first electronic device.

At 303, the first electronic device obtains the selection operation of the operation body for the one application object of the plurality of application objects, and the operation body moves in the first direction when maintaining the selection operation.

At 304, after the operation body moves a first distance in the direction, the display area of the first electronic device displays a plurality of control elements related to the application object corresponding to the selection operation.

At 305, during continuous movement from a position where the first distance is in the first direction, an operation status of at least one control element of the plurality of control elements is controlled.

At 306, if detecting the release selection operation during the movement in the first direction and that the control element related to the projection of the plurality of control elements is in an available status, the first electronic device determines to obtain the projection operation.

At 307, the first electronic device responds to the projection operation to determine the application object corresponding to the selection operation as the first application object, such that the first application object is determined through the selection operation during the projection operation.

At 308, the first electronic device projects the first display content generated by the application program corresponding to the first application object in the operative state to the second display area of the display area of the second electronic device in real-time.

Compared to the screen projection processing method shown in FIG. 5, the difference may include process 304 to process 306. When the operation body maintains the selection operation and moves in the first direction, the display area of the first electronic device may display the control elements related to the application object. The movement in the first direction may change the operation statuses of the control elements. The projection operation may be related to the available control elements.

The control elements related to the application object may at least include control elements related to the project. The control elements related to the projection being in the available status may indicate that the corresponding application object may be projected to the second electronic device. The control elements related to the projection being in the forbidden status may indicate the corresponding application object may be forbidden to be projected to the second electronic device. The control elements related to the application object may further include a control element having another function, for example, a control element having a function of displaying application information of the application object.

If the operation body continues to move in the first direction after moving the first distance, the operation status of the control element may change like a moving distance in the first direction. Changing the operation status of the control element may include, but not limited to, causing the operation status of a control element of all the control elements related to the application object to be in an available status as the moving distance changes in the first direction and causing the operation statuses of the other control elements to be in the forbidden status. The control element that is in the available status may change as the distance changes.

Figure 8:
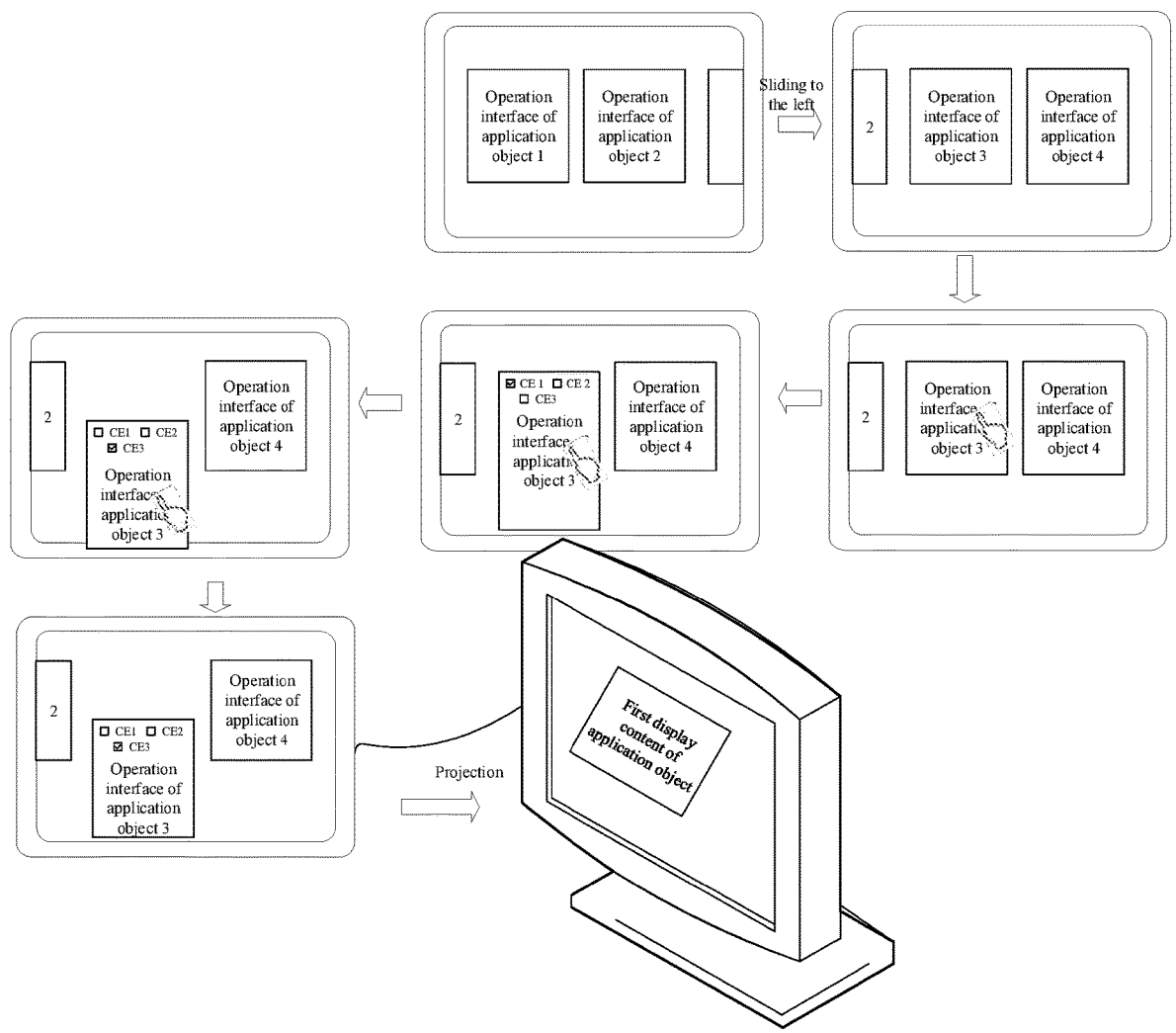
FIG. 8 illustrates a schematic diagram of selecting the first application object for display through the projection operation according to some other embodiments of the present disclosure.

As shown in FIG. 8, after the operation body moves to the first distance, the display area of the first electronic device displays three control elements, including an application information control element (control element 1 in FIG. 8), a lock control element (control element 2 in FIG. 8), and a projection control element (control element 3 in FIG. 8). The application information control element may be configured to indicate displaying the application information of the application object. The lock control element may be configured to indicate locking the application program. The projection control element may be configured to indicate performing projection on the application object.

If the operation body moves for the first distance, the operation status of the application information control element is in the available status (e.g., checking in FIG. 8 indicating that the control element is selected and in the available status), and the operation statuses of the other two control elements are in the forbidden status. If the operation body continues to move in the first direction to a second distance, the operation status of the application information control element may switch from the available status to the forbidden status, the operation status of the lock control element may switch from the forbidden status to the available status, and the operation status of the projection control element may remain in the forbidden status. If the operation body continues to move in the first direction to a third distance from the second distance, the operation status of the application information control element may remain in the forbidden status, the operation status of the lock control element may switch from the available status to the forbidden status, and the operation status of the projection control element may switch from the forbidden status to the available status. If the operation body moves to an opposite direction of the first direction during the movement, the operation statuses of the control elements may also switch. The switch of the operation status of the control elements may be related to the moving distance, which is not repeated here.

If the projection control element is in the available status, and the first electronic device detects the release selection operation, the first electronic device may determine to obtain the projection operation. As shown in FIG. 8, lifting up the operation body when the projection control element is in the available status indicates that the selection operation is released/ended, the first electronic device determines to obtain the projection operation. The first electronic device may synchronize the first display content displayed in real-time when the first application object that is selected through the selection operation is in the operative state in the display area of the second electronic device for display.

The operation status of the control elements related to the application object displayed in the display area of the first electronic device may be controlled through the movement of the operation body. Thus, the user may know the control element that is in the available status through the display of the first electronic device. If the control element related to the projection is in the available status, the user may determine that the first electronic device may be triggered to perform projection. Thus, the operation of the user in the first electronic device may be assisted in connection with the change of the operation status of the control elements displayed in the display area of the first electronic device. Thus, the user may release the selection operation when determining that the first electronic device may perform the projection.

Figure 9:
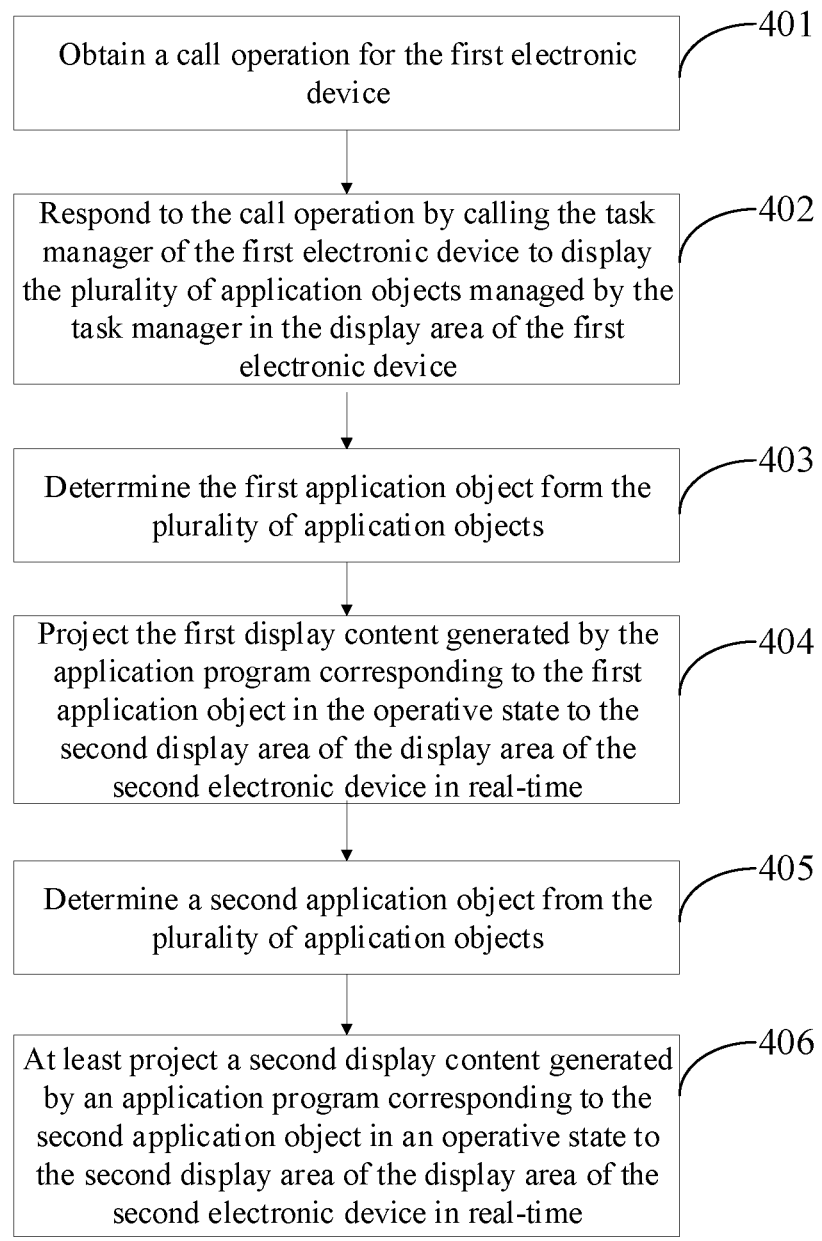
FIG. 9 illustrates a schematic flowchart of a screen projection processing method according to some other embodiments of the present disclosure.

FIG. 9 illustrates a schematic flowchart of a screen projection processing method according to some other embodiments of the present disclosure. The method includes the following processes.

At 401, the first electronic device obtains a call operation for the first electronic device.

At 402, the first electronic device responds to the call operation to call the task manager of the first electronic device to display the plurality of application objects managed by the task manager in the display area of the first electronic device.

At 403, the first electronic device determines the first application object from the plurality of application objects to determine the first application object through the selection operation during the projection operation.

At 404, the first electronic device projects the first display content generated by the application program corresponding to the first application object in the operative state to the second display area of the display area of the second electronic device in real-time.

At 405, the first electronic device determines a second application object from the plurality of application objects. During displaying the first display content in the display area of the second electronic device, the first electronic device may continue to determine the second application object from the plurality of application objects that can be projected. The second application object may be different from the first application object. For the method of determining the second application object, a reference may be made to the method of determining the first application object. The method of determining the second application object may be the same as or different from the method of determining the first application object, which is not described here.

At 406, the first electronic device at least projects a second display content generated by an application program corresponding to the second application object in an operative state to the second display area of the display area of the second electronic device in real-time.

The method of synchronizing the second display content to the display area of the second electronic device for display may include projecting the first display content to a first display area of the display area of the second electronic device for display and projecting the second display content to the second display area of the display area of the second electronic device for display. Thus, the display area of the second electronic device may display the first display content and the second display content simultaneously. The first display area and the second display area may be two independent areas of the display area of the second electronic device. In some other embodiments, the second display area may be the display area of the second electronic device, and the first display area may be a portion of the display area of the second electronic device. Thus, the display area of the second electronic device may display the first display content and the second display content in a picture-in-picture manner.

If the second electronic device displays the first display content and the second display content simultaneously, the second electronic device may provide an audio broadcast function to one application object of the first application object and the second application object for use. For example, the second electronic device may provide the audio broadcast function to the second application object for use to prevent audio mixing of the first application object and the second application object to impact the output effect of the audio.

Another method of synchronizing the second display content to the display area of the second electronic device for display may include replacing the first display content displayed in the display area of the second electronic device with the second display content. As such, after the first electronic device determines another application object for projection, the first electronic device may update the content displayed in the display area of the second electronic device.

After projecting the first display content generated by the application program corresponding to the first application object in the operative state to the second display area of the display area of the second electronic device in real-time, the first electronic device may mark the first application object and the second application object with a projection lock status. The projection lock status may be used to indicate that the display content of the first application object and the second application object is displayed in the second electronic device. The corresponding screen projection processing method may further include if the first electronic device selects the first application object from the plurality of application objects managed by the task manager, projecting a third display content generated by an application program corresponding to the first application object in the operative state to the second display area of the display area of the second electronic device in real-time for display.

That is, if the first electronic device determines the first application object of the plurality of application objects managed by the task manager as a current to-be-projected application object again, the first electronic device may continue to display the content of the first application object in the display area of the second electronic device. Since the display content of the first application object may change as the first application object runs, when determining the first application object as the to-be-projected application object again, the first electronic device may project the third display content generated by the application program corresponding to the first application object in the operative state to the second display area of the display area of the second electronic device in real-time. Thus, the content displayed by the second electronic device may change synchronically as the first application object in the first electronic device runs.

In some embodiments, the first application object and the second application object may be controlled by another method. The method may include if the first electronic device projects the second display content generated by the application program corresponding to the second application object in the operative state to the second display area of the display area of the second electronic device in real-time for display, controlling the first application object to be in the projection forbidden status. During displaying the second application object in the second electronic device, the method may further include dragging the first application object back and controlling the display area of the first display content of the first application object to be limited to the display area of the first electronic device. As such, while the first electronic device switches the display content in the second electronic device, the first electronic device may control the status change of the application object.

If the first electronic device synchronizes the first display content of the first application object to the second electronic device for display, the screen projection processing method may further include controlling the first application object to maintain a lock operative state. The lock status may indicate that during synchronizing the first display content to the second electronic device, forbidding closing the first application object through the task manager. That is, during the task manager performing an object closing operation, all other application objects except the first application object of the plurality of application objects managed by the task manager may be closed, and the first application object may be still in the operative state.

In addition to that, the task manager can close the application objects in the first electronic device, anti-virus software and cleaning software in the first electronic device may close the application objects in the first electronic device. If the first application object remains in the lock operative state, during the anti-virus software and the cleaning software of the first electronic device performing anti-virus and cleaning, the first application object may still in the operative state, and another software may be forbidden to close the first application object.

If at least two application objects of the task manager may be projected, for example, at least two application objects are in the projection lock status, all or one of the at least two application objects may be projected to the second electronic device. The at least two application objects that can be projected to the second electronic device may be all in the lock operative state. Thus, each of the at least two application objects that can be projected to the second electronic device may remain in the operative state when the first electronic device performs an object close function (e.g., close the application object through the task manager).

Figure 10:
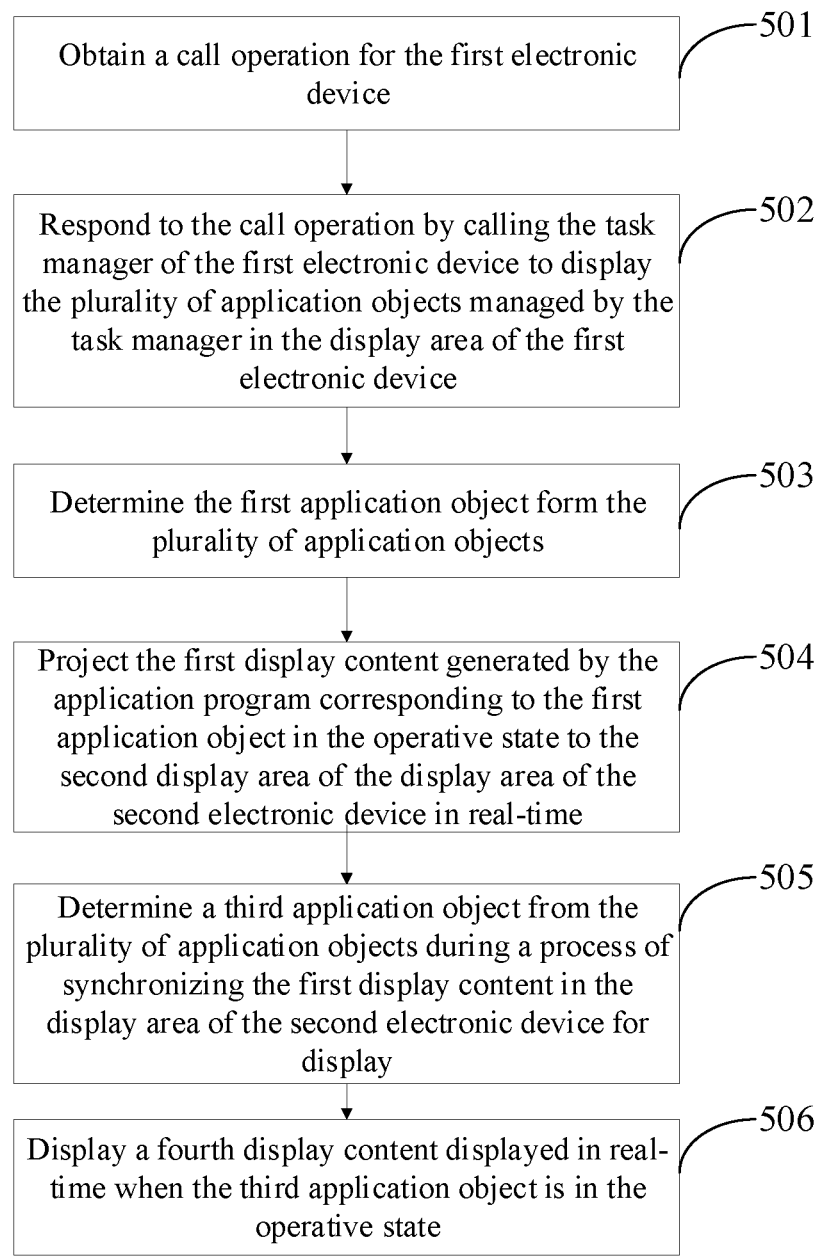
FIG. 10 illustrates a schematic flowchart of a screen projection processing method according to some other embodiments of the present disclosure.

FIG. 10 illustrates a schematic flowchart of a screen projection processing method according to some other embodiments of the present disclosure. The method includes the following processes.

At 501, the first electronic device obtains a call operation for the first electronic device.

At 502, the first electronic device responds to the call operation to call the task manager of the first electronic device to display the plurality of application objects managed by the task manager in the display area of the first electronic device.

At 503, the first electronic device determines the first application object from the plurality of application objects to determine the first application object through the selection operation during the projection operation.

At 504, the first electronic device projects the first display content generated by the application program corresponding to the first application object in the operative state to the second display area of the display area of the second electronic device in real-time for display.

At 505, the first electronic device determines a third application object from the plurality of application objects, during a process of synchronizing the first display content in the display area of the second electronic device for display.

During synchronizing the first display content to the second electronic device for display. The display area of the first electronic device may stop at the display interface of the task manager. The display area of the first electronic device may continue to display the plurality of application objects of the task manager.

During continuing to display the plurality of application objects, the first electronic device may obtain the operation of the operation body for the plurality of application objects to select the third application object from the plurality of application objects. The selected third application object may be displayed in the display area of the first electronic device. Display of the third application object in the first electronic device may not impact the display in the second electronic device.

The operation of the operation body for the plurality of application objects may include a selection operation, for example, a single click operation for one application object of the plurality of application objects. In some embodiments, the third application object displayed in the display area of the first electronic device may be determined by another method.

At 506, the display area of the first electronic device displays a fourth display content displayed in real-time when the third application object is in the operative state. For the fourth display content displayed in real-time when the third application object is in the operative state, a reference may be made to the description of the first display content, which is not repeated here.

Through the above technical solution, during displaying the first display content in the second electronic device, the first electronic device may still continue to determine the third application object from the plurality of application objects to display the fourth display content displayed in real-time when the third application object is in the operative state to the display are of the first electronic device. Thus, the task manager may be used as the entrance of the display content for both the first electronic device and the second electronic device. The first electronic device and the second electronic device may display different application objects that are independent of each other to avoid mutual impact between the first electronic device and the second electronic device.

After synchronizing the first display content of the first application object to the second electronic device for display, the screen projection processing method may further include setting the first application object as a first object in a management queue of the task manager. Thus, after the first electronic device calls the task manager, the display area of the first electronic device may first display the first application object. As such, when the first electronic device calls the task manager again, the display area of the first electronic device may first display the application object that is currently projected to the second electronic device.

If the first electronic device changes the projection of the first application object to the second application object, and the first application object is in the projection lock status, orders of the first application object and the second application object may be adjusted in the management queue. For example, the second application object may be the first object in the management queue. The first application object may be a second object in the management queue. As such, the application object that is in the projection lock status may be displayed first.

That is, if a plurality of application objects of the first electronic device are in the projection lock status, the plurality of application objects that are in the projection lock status may be arranged before other application objects. The application object that is currently projected at the second electronic device may be the first object in the management queue.

Figure 11:
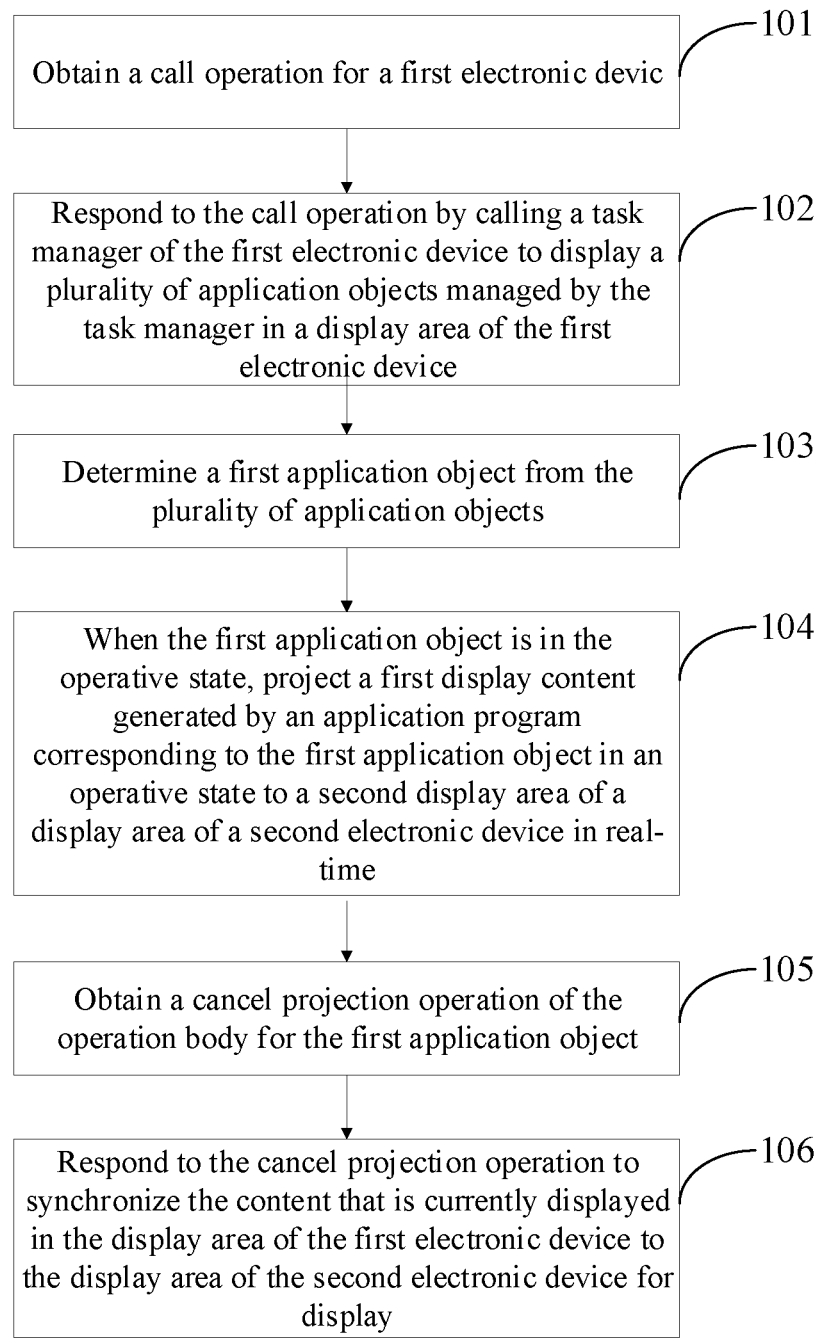
FIG. 11 illustrates a schematic flowchart of a screen projection processing method according to some other embodiments of the present disclosure.

In the description of projecting the application object of the task manager to the second electronic device for display, in addition to project, the application object to the second electronic device, the projection of the application object may be canceled. For example, the screen projection processing method in FIG. 11, the method may further include the following processes based on the screen projection processing method in FIG. 1.

At 105, the first electronic device obtains a cancel projection operation of the operation body for the first application object.

At 106, the first electronic device responds to the cancel projection operation to synchronize the content that is currently displayed in the display area of the first electronic device to the display area of the second electronic device for display to replace the content displayed in the display area of the second electronic device through the cancel projection operation. The cancel projection operation also causes the contents displayed in the first electronic device and the second electronic device to be synchronized.

A method of obtaining the cancel projection operation of the operation body for the first application object may include obtaining the selection operation of the operation body for the first application object. The operation body may move in a second direction when maintaining the selection operation. If detecting the release selection operation during the movement in the second direction, the first electronic device may determine to obtain the cancel projection operation.

The second direction may be opposite to the first direction corresponding to the projection operation. For example, the first direction corresponding to the projection operation may point downward, and the second direction may point upward. From detecting that the first application object is selected by the selection operation to dragging the first application object to move in the second direction and to ending the selection operation, one cancel projection operation may be completed. When detecting the down event, the move event with the direction of the move event that is the second direction, and the up event, the first electronic device may determine to obtain the cancel projection operation.

Another method of obtaining the cancel projection operation of the operation body for the first application object may include obtaining the selection operation of the operation body for the first application object. The operation body may move in the first direction when maintaining the selection operation. When the operation body moves for a second distance in the first direction, the display area of the first electronic device may display the plurality of control elements related to the first application object. When the operation body continues to move in the first direction from the position where the second distance is, the first electronic device may control the operation status of at least one control element of the plurality of control elements. If the first electronic device detecting the release selection operation during the movement in the first direction, and the control elements related to the projection of the plurality of control elements are in the forbidden status, the first electronic device may determine to obtain the cancel projection operation.

The second distance may be the same or different from the first distance corresponding to the projection operation. The difference from the above projection operation may be as follows. If the first electronic device detects that the control elements related to the projection area in the forbidden status during the release selection operation in the movement in the first direction, the first electronic device obtains the cancel projection operation. The first electronic device may be instructed to synchronize the content that is currently displayed to the second electronic device to replace the content displayed in the display area of the second electronic device. Thus, the contents displayed in the first electronic device and the second electronic device may be synchronized.

In addition, the cancel projection operation may include another function. For example, the first electronic device may obtain the cancel projection operation of the operation body for the first application object and respond to the cancel projection operation to display the display content of the first application object in the display area of the first electronic device. Thus, through the cancel projection operation, the first electronic device may switch the first application object to the first electronic device to continue for display. Thus, the first application object may continue to run in the first electronic device in the phase to where the first application object runs in the second electronic device to ensure that the first application object may be smoothly switched and displayed between the first electronic device and the second electronic device. As such, when the first application object is desired to be switched and displayed in the first electronic device, the display of the first application object in the second electronic device may not need to be closed, and the first application object may not need to be restarted. The cancel projection operation may cause the first application object to be switched and displayed smoothly between the first electronic device and the second electronic device.

Figure 12:
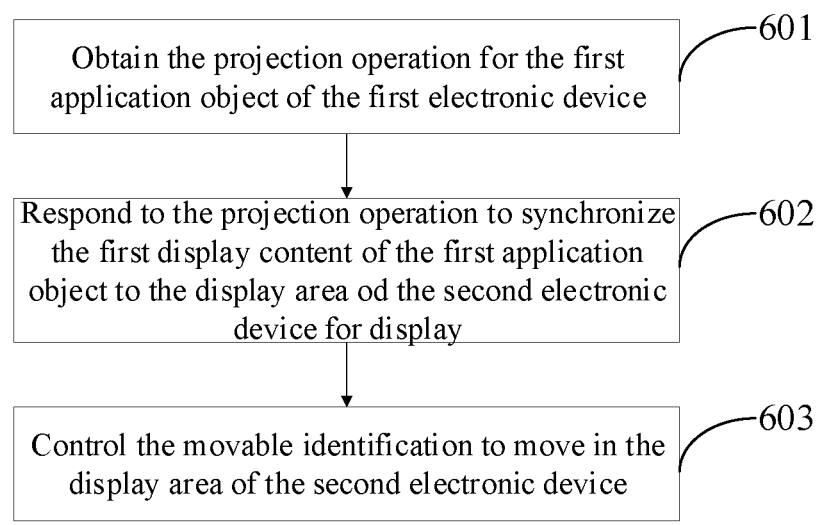
FIG. 12 illustrates a schematic flowchart of a control method according to some embodiments of the present disclosure.

FIG. 12 illustrates a schematic flowchart of a control method according to some embodiments of the present disclosure. The method includes the following processes.

At 601, the first electronic device obtains the projection operation for the first application object of the first electronic device.

The first application object may include one application object selected by the user from the first electronic device. For example, the first application object may include the one application object selected by the user from the plurality of application objects displayed on the desktop of the first electronic device. In some embodiments, the first application object may be determined using the following method.

The method may include obtaining the call operation for the first electronic device, responding to the call operation to call the task manager of the first electronic device to display the plurality of application objects managed by the task manager in the display area of the first electronic device and determine the first application object from the plurality of application objects. As such, the task manager may be used as the entrance for expansion and projection. The first electronic device may determine the one application object of the plurality of application objects managed by the task manager as the first application object. The first electronic device may perform the projection operation on the first application object. For a detailed process, reference may be made to the above-related description, which is not repeated here.

At 602, the first electronic device responds to the projection operation to synchronize the first display content of the first application object to the display area of the second electronic device for display.

The projection operation may be used to instruct that the display area of the first display content of the first application object may include the display area of the second electronic device. After obtaining the projection operation, the first electronic device may be triggered to synchronize the first display content of the first application object to the display area of the second electronic device for display. The first display content of the first application object may include the first display content displayed in real-time when the first application object is in the operative state. The first display content displayed in real-time when the first application object is in the operative state may include, but be not limited to, the content displayed currently by the first electronic device when the first application object is in the operative state. Thus, when the first electronic device projects the first application object to the display area of the second electronic device for display, it can be ensured to switch the first application object to the second electronic device. Thus, the content of the first application object that has been run in the first electronic device may not need to be repeated in the second electronic device.

In some embodiments, the projection operation may include the projection operation of the operation body for the first application object. The projection operation may include selecting the first application object and triggering to synchronize the first display content of the first application object to the second electronic device. For example, a complete projection operation may include detecting the selection operation for the first application object, dragging the first application object to move in the first direction, and ending the selection operation. Another method for the projection operation may not be described one by one in embodiments of the present disclosure.

At 603, the movable identification may be controlled to move in the display area of the second electronic device.

If the first electronic device may synchronize the first display content of the first application object to the display area of the second electronic device, the movable identification may be synchronized to the second electronic device to limit the movable identification to move in the display area of the second electronic device. Since the movable identification may move in the display area of the second electronic device, the movable identification may be displayed in the display area of the second electronic device. Therefore, if the first electronic device synchronizes the first display content projected to the first application object. Both the movement and the display of the movable identification may be limited to the display area of the second electronic device.

The movable identification may include, but be not limited to, an image, such as a mouse pointer and a cursor, that may move as an input element moves. The input element may be connected to the first electronic device. for example, the input element may include a mouse and a keyboard. The movable identification may be controlled by the input element of the first electronic device to move in the second electronic device. As such, the movable identification may be controlled at least by the input element of the first electronic device to perform a control operation such as slide and click. Thus, the first application object displayed in the second electronic device may be controlled through the first electronic device. The first application object may be controlled, and the display content of the second electronic device may be updated. Thus, when the first application object may need to be controlled, the first application object may not need to be switched to the first electronic device for display. After the control is performed, the display content of the first application object may not need to be synchronized to the second electronic device through the projection operation again.

A connection manner between the input element and the first electronic device may include, but be not limited to, the following processes. The input element may be connected to the expansion interface of the first electronic device. For example, the first electronic device may reserve a type-c interface. The type-c interface may be configured as the expansion interface of the first electronic device. Thus, the first electronic device may be connected to the mouse and keyboard having the type-c interfaces. Different types of input elements may be connected to the first electronic device. In addition to the mouse and keyboard, the first electronic device may be connected to another hardware through the expansion interface for the use of the first electronic device. A form of the expansion interface reserved by the first electronic device may be not limited to the type-c interface.

During controlling the first application object in the second electronic device through the first electronic device, the first electronic device may not display the content displayed in real-time when the first application object is in the operative state during the control process. The first electronic device may transmit the content displayed in real-time when the first application object is in the operative state to the second electronic device for display. That is, during controlling the first application object, although the computation processing function corresponding to the control operation may be integrated into the first electronic device, the first electronic device only performs processing on the first application object based on the control operation. The first electronic device may transmit the display content obtained after the processing to the second electronic device for display. The first electronic device may be forbidden to display the display content obtained after the processing.

To control the movable identification to move in the display area of the second electronic device, in some embodiment, when the first electronic device selects a mapping display area of the movable identification, the first electronic device may map the movable identification to the display area of the second electronic device first. As such, when responding to the projection operation, the first electronic device may control the movement and display of the movable identification in the display area of the second electronic device.

The projection of the first electronic device may include a first type projection and a second type projection. The first type of projection may projecting the first display content generated by the application program corresponding to the first application object in the operative state to the second display area of the display area of the second electronic device in real-time. However, the first electronic device may display a display content displayed in real-time when another application object is in the operative state. The second type projection may include that the first electronic device and the second electronic device may display the display content displayed in real-time when the same application object is in the operative state.

Figure 13:
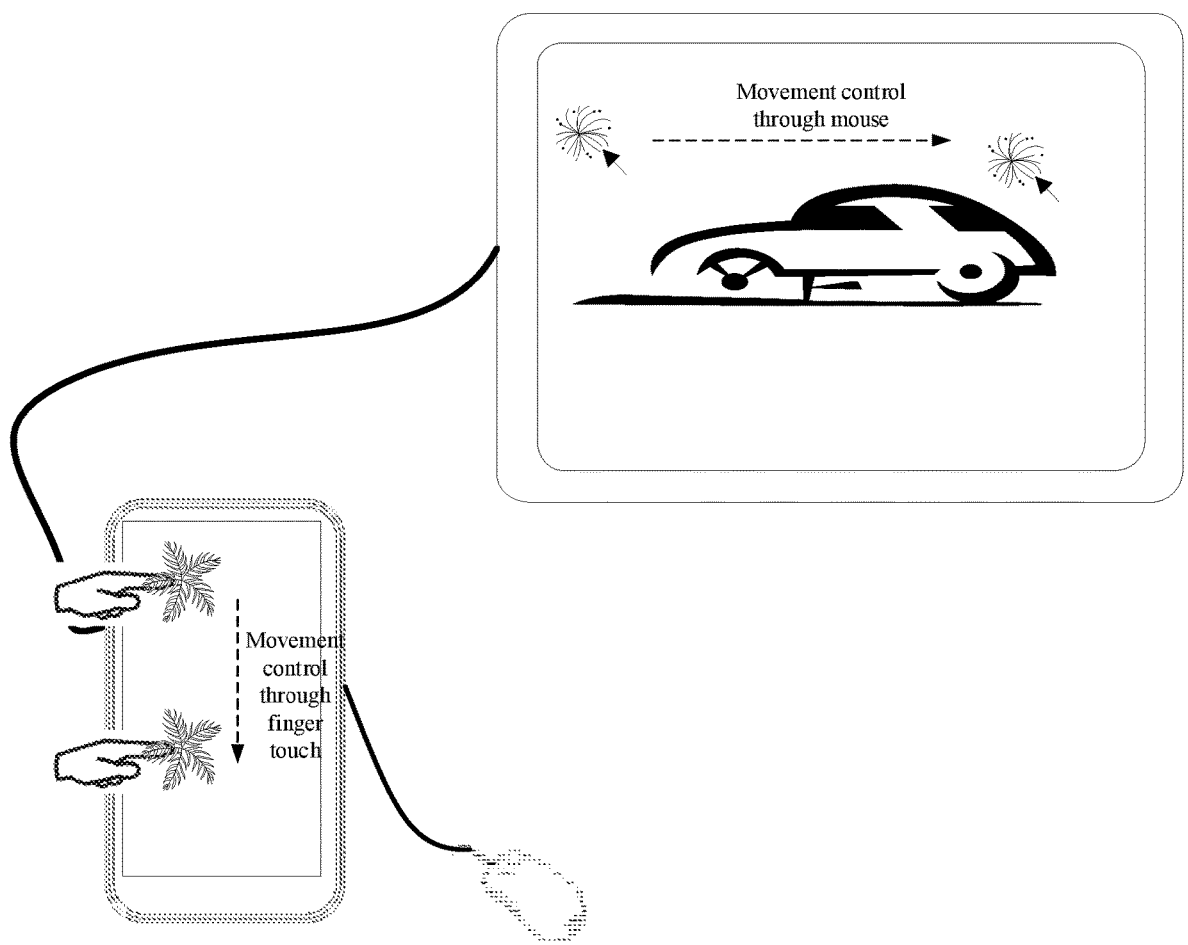
FIG. 13 illustrates a schematic diagram showing a first electronic device and a second electronic device performing different operations simultaneously according to some embodiments of the present disclosure.

For these two types of projection, if the projection operation triggers the first type projection, the first electronic device may control the movable identification to move in the display area of the second electronic device. the first application object may be controlled through the input elements of the first electronic device. Meanwhile, if the first electronic device has a touch function, the first electronic device may control the application object displayed in the first electronic device through the touch operation. As such, although the first electronic device and the second electronic device may display different application objects, the first electronic device may perform individual control on the two application objects. Thus, the two application objects may be independent of each other and may not affect each other. As shown in FIG. 13, the second electronic device may display application object 1, in the first electronic device, and the first electronic device may display application object 2. The first electronic device may be connected to the mouse via the pre-reserved expansion interface. The mouse pointer may be displayed and moved in the second electronic device. the mouse pointer may be used to control the display content of the application object 1 displayed in the second electronic device to change. The first electronic device may control the display content of application object 2 to change through a finger touch function. If the projection operation triggers the second type of projection, the movable identification may be controlled to move in the display area of the first electronic device. Through a rendering function, the first electronic device may render the movement of the movable identification to the display content corresponding to the first electronic device. Then, the first electronic device may synchronize the movement of the movable identification to the second electronic device to cause the second electronic device to display the movement of the movable identification. Thus, it is ensured that the display contents of the first electronic device and the second electronic device are the same.

However, no matter the first type projection or the second type projection, the computation processing function may be integrated into the first electronic device. That is, the processing of the application objects displayed in the first electronic device and the second electronic device may be implemented by the first electronic device, as long as the second electronic device includes the display function.

In the above control method, after obtaining the projection operation of the first application object in the first electronic device, the first electronic device may respond to the projection operation, synchronize the first display content of the first application object to the display area of the second electronic device for display, and controlling the movable identification to move in the display area of the second electronic device. As such, the movable identification may be controlled at least through the input elements of the first electronic device to perform the control operation such as slide and click. Thus, the first application object in the second electronic device may be controlled through the first electronic device. The first application object may be controlled, and the display content of the second electronic device may be updated. As such, when the first application object needs to be controlled, the first application object may not need to be switched to the first electronic device for display. Moreover, after completing the control, the first electronic device may not need to synchronize the display content of the first application object to the second electronic device through the projection operation again.

In some embodiments, the input element may be configured to control the movement of the movable identification in the display area of the second electronic device. The input element may belong to the first electronic device. Thus, to control the movement of the movable identification, a control method provided by embodiments of the present disclosure may further include obtaining first movement data of the input element corresponding to the movable identification in the first electronic device and calculating second movement data of the input element in the second electronic device based on the first movement data.

The first movement data may include movement data generated when the input element of the first electronic device is under an user operation. For example, the mouse may move for a distance under the user operation. when the input element generates different pieces of first movable data, the movement of the movable identification in the display area of the second electronic device may be different. However, the first movement data may not be directly used as the movement data of the movable identification. The second movement data of the input element in the second electronic device may need to be calculated based on the first movement data. For example, based on the first movement data and the coordinate system of the display area of the second electronic device, the first electronic device may map the first movement data to the coordinate system of the display area of the second electronic device to obtain the second movement data of the input element in the second electronic device. Then, based on the second movement data, the first electronic device may control the movable identification to move in the display area of the second electronic device.

The second movement data at least may indicate a movement direction and a movement distance of the input element in the second electronic device. The first electronic device may control the movement of the movable identification based on the movement direction and the movement distance indicated by the second movement data. A specific process is not described here.

Figure 14:
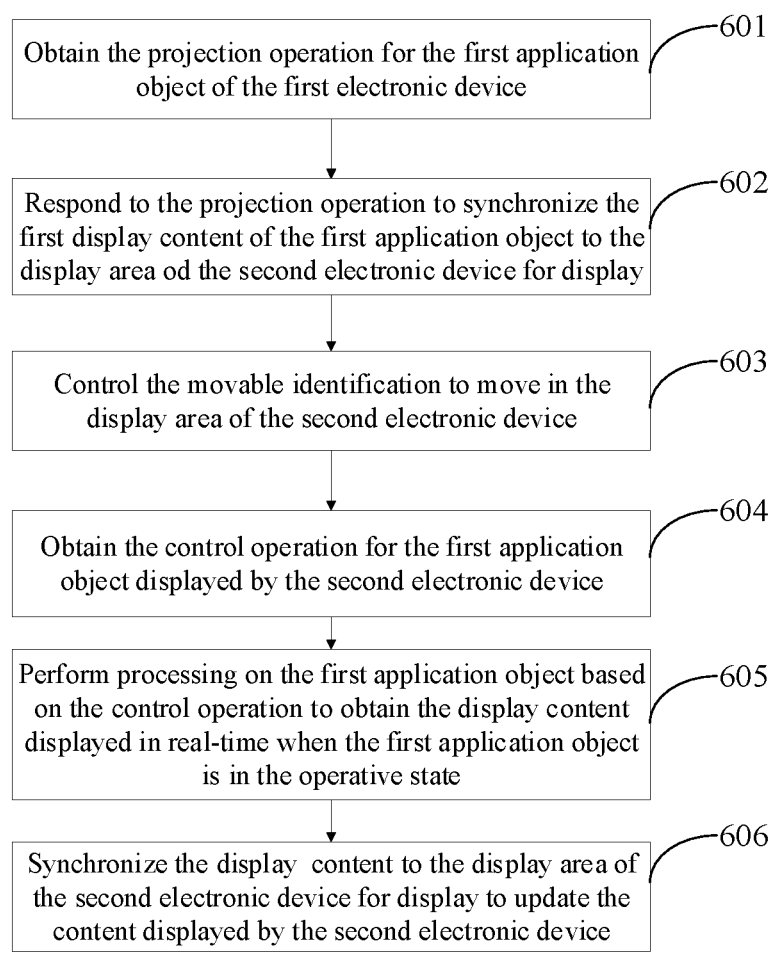
FIG. 14 illustrates a schematic flowchart of a control method according to some other embodiments of the present disclosure.

FIG. 14 illustrates a schematic flowchart of a control method according to some other embodiments of the present disclosure. The method further includes the following processes based on FIG. 12.

At 604, the first electronic device obtains the control operation for the first application object displayed by the second electronic device. The control operation for the first application object may include, but not limited to, a control operation acted by the input element of the first electronic device, for example, the control operation performed by the input element, such as click, slide, and input, which can change the display of the second electronic device. The control operation may include a control operation obtained by combining a series of actions or a control operation obtained by a single action. The type of the control operation is not limited by embodiments of the present disclosure.

At 605, the first electronic device performs processing on the first application object based on the control operation to obtain the display content displayed in real-time when the first application object is in the operative state. The first electronic device may process the first application object differently if the control operation is not simultaneous. For example, the slide operation may be performed on the first electronic device to determine a content pointed by the slide operation. A target content pointed by the slide operation may include the display content displayed in real-time when the first application object is in the operative state. Processing of the first application object based on the control operation is not further described in detail here. The control operation may be detected and obtained by the first electronic device. The first electronic device may also perform the processing on the first application object based on the control operation. However, the first electronic device may not display the display content displayed in real-time when the first application object is in the operative state obtained after the processing. The display area of the first electronic device may display a display content displayed in real-time when another application object is in the operative state. Thus, the first electronic device and the second electronic device may display different application objects to cause at least two application objects of the first electronic device to be displayed in different electronic devices.

At 606, the first electronic device synchronizes the display content to the display area of the second electronic device for display to update the content displayed by the second electronic device. The first electronic device may transmit the display content obtained after the processing based on the control operation to the second electronic device in real-time for display. Thus, the display content in the second electronic device may change with the control operation to provide the user with instant vision experience.

For example, the first application object may include a gaming application. the second electronic device may display a gaming scene of the gaming application, for example, a fighting scene, a product auction scene, a chat scene of the gaming application. For any gaming scene, the gaming scene may be controlled through the first electronic device. For example, the user may control an avatar in the gaming application to perform fighting through the mouse and keyboard of the first electronic device. The second electronic device may display the process of the fighting synchronically to provide the user with the experience of operating the fighting in the second electronic device.

During the second electronic device displaying the related content of the first application object, the first electronic device may display another application object and perform control on the another application object. The corresponding control method of embodiments of the present disclosure further includes the following processes.

During maintaining the first application object to be displayed in the display area of the second electronic device, the first electronic device may display an application object in the display area of the first electronic device. The first electronic device may obtain the control operation for the application object. The first electronic device may perform processing on the application object based on the control operation for the application object to obtain the display content displayed in real-time when the application object is in the operative state. The first electronic device may display the display content in the display area of the first electronic device. The content displayed in the display area of the second electronic device may be maintained unchanged.

During maintaining the first application object to be displayed in the display area of the second electronic device, the first electronic device may independently display another application object and perform control on the another application object independently. The display of the second electronic device may not be impacted. Thus, the two application objects may be displayed on different electronic devices.

For simple description, method embodiments are described as a series of action combinations. Those skilled in the art should be aware that the present disclosure is not limited by the described action sequence. According to the present disclosure, certain processes may be performed in another sequence or simultaneously. Those skilled in the art should also be aware that embodiments described in the specification are some embodiments, and the actions and modules involved are not necessarily required by the present disclosure.

Figure 15:
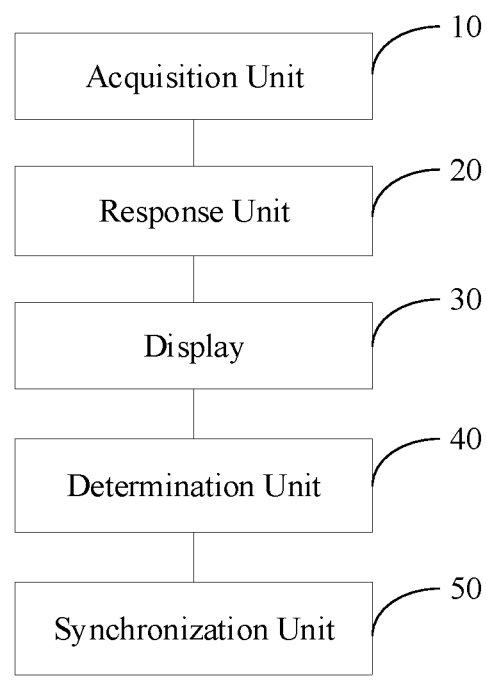
FIG. 15 illustrates a structural diagram of a projection processing device according to some embodiments of the present disclosure.

Corresponding to the screen projection processing method, the present disclosure further provides a projection processing device. FIG. 15 illustrates a structural diagram of the projection processing device according to some embodiments of the present disclosure. The projection processing device includes an acquisition unit 10, a response unit 20, a display 30, a determination unit 40, and a synchronization unit 50.

The acquisition unit 10 may be configured to obtain a call operation for the first electronic device. The call operation may include a function of calling the task manager. The first electronic device may call the task manager when acquisition unit 10 obtains the call operation for the first electronic device. The call operation may include at least one of a gesture operation for the first electronic device or an operation for a component of the first electronic device. For example, the call operation may include a slide operation (e.g., slide upward) for the display area of the first electronic device. For another example, the call operation may include a double click operation for a home key of the first electronic device. For the detailed description, reference may be made to method embodiments.

The response unit 20 may be configured to respond to the call operation to call the task manager of the first electronic device.

The display 30 may be configured to display the plurality of application objects managed by the task manager in the display area of the first electronic device. If the first electronic device calls the task manager of the first electronic device, the display unit 30 may display the plurality of application objects of the task manager in the display area of the first electronic device. The task manager may be used as an entrance for expansion and projection. Display content of at least one of the plurality of application objects may be projected to the second electronic device for display. The plurality of application objects of the task manager may include application objects used by the first electronic device in a predetermined period. The application objects may include at least one type of application object that has been closed, has been used and switched to background operation, and is currently in operation. The predetermined period may start from when the response unit 20 responds to the call operation for a certain time. Embodiments of the present disclosure do not limit the predetermined period.

The determination unit 40 may be configured to determine the first application object from the plurality of application objects.

The first application object may include an application object of the plurality of application objects. The first application object may be determined based on an operation of the operation body for the plurality of application objects. An application object may be selected from the plurality of application objects as the first application object through the operation. In some other embodiments, the first application object may be determined automatically from the plurality of application objects. For example, the first application object of the task manager may be determined as the first application object. For example, use data of each application object of the plurality of application objects of the task manager may be obtained. Based on the use data of each application object, the first application object may be determined from the plurality of application objects. The use data may at least indicate a use frequency of the application objects and/or a projected frequency of the application objects. Based on the use data, the first application object may be selected with the use frequency and/or the projected frequency matching a predetermined condition. For example, the predetermined condition may include the application object with the maximum use frequency or the use frequency greater than a certain threshold. The predetermined condition is not limited by embodiments of the present disclosure.

The synchronization unit 50 may be configured to project the first display content generated by the application program corresponding to the first application object in the operative state to the second display area of the display area of the second electronic device in real-time for display. As such, the first electronic device may project the first display content of the first application object to the display area of the second electronic device for display.

In some embodiments, two projection modes may be included. In a first projection mode, the first electronic device may operate an application object corresponding to the first object. The display content displayed in the first electronic device may be synchronized in the second electronic device, that is, the first electronic device and the second electronic device may display the same display content. In a second projection mode, the first electronic device may operate the application object, and the display content may be displayed on the second electronic device, that is, the first electronic device and the second electronic device may not display the same display content. The first electronic device may be preset to use one of the projection modes as a default. In some embodiments, a user may select one of the projection modes The first display content may include the content displayed in real-time when the first application object is in the operative state. That is the content that may be displayed currently in the first electronic device when the first application object is displayed in the display area of the first electronic device. When the first electronic device is in the operative state, the status of the first application object in the second electronic device may be the same as the status of the first application object in the first electronic device. For example, the status of the first application object may include an operation phase of the first application object and a display picture in the operation phase. During a process of projecting the first application object to the display area of the second electronic device, the first application object may be directly operated to the operation phase where the first application object is in the first electronic device in the second electronic device, and the display picture in the operation phase may be displayed.

If the first application object is in the closed status in the first electronic device, during projecting the first electronic device to the second electronic device, the first electronic device may switch from the closed status to the operative state to project the first display content generated by the application program corresponding to the first application object in the operative state to the second display area of the display area of the second electronic device in real-time. Thus, a projection process may not only include a content projection function but also trigger the first application object to change to the operation status. Thus, the first application object may switch automatically from the closed status to the operative state. Therefore, a start operation may not need to be executed for the first application object.

During projecting the first display content displayed in real-time of the first application object in the operative state, a content displayed in real-time of another application object in the operation status may be displayed in the first electronic device. The content displayed in the first electronic device and the content displayed in the second electronic device may be independent of each other. Thus, the application objects corresponding to the first electronic device and the second electronic device may not impact each other. For example, a user may play a game through the first electronic device and watch live broadcasting through the second electronic device. For another example, the user may chat through the first electronic device and watch a video through the second electronic device. For another example, the user may play a game through the first electronic device and perform away from the keyboard in the second electronic device. Thus, the first electronic device and the second electronic device may operate different application objects to satisfy different user needs.

In some embodiments, the another application object displayed in the first electronic device may include an application object determined from the desktop of the first electronic device. For example, the application object may be selected according to the selection operation of the operation body for the display area of the first electronic device. The another application object of the first electronic device may be determined in another manner, which is not repeated here.

The first electronic device and the second electronic device may be connected through at least one of a wired connection manner or a wireless connection manner. The relationship between the second electronic device and the first electronic device may include but not limited to as follows. The display area of the second electronic device may be larger than the display area of the first electronic device. Thus, the first electronic device may project the display content of the application object that requires the larger display area to the display area of the second electronic device. In addition, the second electronic device may include an electronic device that may include a display function but not a computation function. For example, the second electronic device may include a display or a monitor. The second electronic device may not include an input element such as a mouse or a keyboard. The second electronic device may be controlled through the input element of the first electronic device. The first electronic device may also process computation required by control. The first electronic device may transmit the content displayed in real-time obtained after processing to the second electronic device for display.

The projection processing device may be configured to obtain the call operation for the first electronic device, respond to the call operation to call the task manager of the first electronic device to display the plurality of application objects managed by the task manager displayed in the display area of the first electronic device, determine the first application object from the plurality of application objects, and project the first display content generated by the application program corresponding to the first application object in the operative state to the second display area of the display area of the second electronic device in real-time for display. Thus, the task manager may be used as an entrance for expansion and projection. The first application object may be selected from the plurality of application objects managed by the task manager to be the application object for expansion and projection. Since the quantity of the application objects in the task manager is less than the quantity of the application objects on the desktop, the first application object may be selected from the plurality of application objects, and the quantity of the application objects that can be selected may be controlled to improve selection efficiency.

During the projection, the first electronic device may project the first display content generated by the application program corresponding to the first application object in the operative state to the second display area of the display area of the second electronic device in real-time. Thus, the first application object is in the operative state when the first electronic device projects the first application object to the second electronic device. As such, even the first application object is in the closed status in the first electronic device, the first electronic device may control the first application object to switch from the closed status to the operation status during the projection. If the first application object is in the operative state in the first electronic device, the first application object may maintain the operative state when being projected to the second electronic device. The content displayed may include the first display content displayed in real-time when the first application object is in the operative state. Thus, the status of the first application object in the second electronic device may be the same as the status of the first application object in the first electronic device. Some operations of the first application object may be saved in the second electronic device to speed up the operation of the first application object in the second electronic device.

In some embodiments, determination of the first application object may be triggered through the projection operation. The acquisition unit 10 of the corresponding projection processing device may be further configured to obtain the selection operation of the operation body for one application object of the plurality application objects. During maintaining the selection operation, the operation body may move in the first direction. If detecting the release selection operation during the movement in the first direction, the acquisition unit 10 may determine the projection operation.

The selection operation may be used to indicate to select the one application object of the plurality of application objects. During maintaining the selection, the operation body may drag the selected application object to move in the first direction. Thus, the one application object of the plurality of application objects may be in the selection and drag status.

The first direction may include a direction of left, right, up, and down. The display area of the first electronic device may currently display at least one application object of all the application objects managed by the task manager. The first electronic device may not select the one application object that is currently displayed to project to the second electronic device. When a switch operation for the display area of the first electronic device is obtained, the application object displayed in the display area of the first electronic device may be switched. For example, after the slide operation for the display area of the first electronic device is obtained, the application object displayed in the display area of the first electronic device may be switched. For example, sliding to the left and sliding to the right may both switch the application object displayed in the display area of the first electronic device. To distinguish from switching the application object, the first direction, in which the one application moves after being selected based on the selection operation, may be different from the sliding direction for switching the application object, for example, the first direction is upward or downward.

The release selection operation may indicate that the selection operation ends. From detecting the selection operation to dragging the first application object to move in the first direction and to ending the selection operation, a projection operation may be completed. The acquisition unit 10 may determine to obtain the projection operation when detecting the down event, the move event with the direction of the move event that is the first direction, and the up event.

The determination unit 40 may be configured to respond to the projection operation to determine the application object corresponding to the selection operation as the first application object. In some embodiments, the projection operation may be used to determine the first application object from the plurality of application objects and instruct the first electronic device to synchronize the first display content to the display area of the second electronic device for display. Thus, the projection operation may include functions of determining the first application object, determining the first display content, and synchronizing the first display content to the second electronic device. Thus, the first electronic device may complete the plurality of tasks through the projection operation.

In the projection processing device, from detecting the selection operation to dragging the first application object to move in the first direction and to ending the selection operation, a projection operation may be completed. The first electronic device may respond to the projection operation to determine the first application object from the plurality of application objects and instruct the first electronic device to synchronize the first display content to the display area of the second electronic device for display. Thus, the projection operation may include the function of determining the first application object, determining the first display content, and synchronizing the first display content to the second electronic device. Thus, the first electronic device may complete the plurality of tasks through the projection operation.

In some embodiments, the display 30 may be further configured to display a plurality of control elements related to the application objects corresponding to the selection operation displayed in the display area of the first electronic device when the operation body moves for a first distance in the first direction. The control unit of the projection processing device may be configured to control the operation status of the at least one control element of the plurality of control elements when the operation body continues to move in the first direction from the position where the first distance is. If the first electronic device detects the release selection operation, and the control element related to the projection of the plurality control elements is in the available status during the movement in the first direction, the acquisition unit 10 may determine to obtain the projection operation. Thus, the operation of the user in the first electronic device may be assisted in connection with the change of the operation status of the control element displayed in the display area of the first electronic device to determine that the user releases the selection operation when the first electronic device is able to perform projection.

In the projection processing device, the determination unit 40 may be further configured to determine the second application object from the plurality of application objects. During displaying the first display content in the display area of the second electronic device, the determination unit 40 may continue to determine the second application object that can be projected from the plurality of application objects. The second application object may be different from the first application object. For the method of determining the second application object, a reference may be made to the method of determining the first application object. The method of determining the second application object may be the same as or different from the method of determining the first application object, which is not described here.

The synchronization unit 50 may be further configured to project the second display content generated by the application program corresponding to the second application object in the operative state to the second display area of the display area of the second electronic device in real-time for display. Thus, the first electronic device may project the second display content of the second application object to the display area of the second electronic device for display.

A method of synchronizing the second display content to the display area of the second electronic device for display includes the following processes. The first electronic device may synchronize the first display content to a first display area of the display area of the second electronic device for display and the second display content to a second display area of the display area of the second electronic device for display. If the display area of the second electronic device displays the first display content and the second display content simultaneously, the audio broadcast function of the second electronic device may be provided to one application object of the first application object and the second application object for use. For example, the audio broadcast function may be provided to the second application object for use to prevent the audio mixing of the first application object and the second application object to impact the output effect of the audio.

Another method of synchronizing the second display content to the display area of the second electronic device for display may include replacing the first display content displayed in the display area of the second electronic device with the second display content. Thus, after determining another application object for projection, the first electronic device may update the content displayed in the display area of the second.

After the first electronic device synchronizes the first display content of the first application object and the second display content of the second application object to the display area of the second electronic device, the first electronic device may mark the first application object and the second application object with the projection lock status. The projection lock status may be used to indicate that the display contents of the first application object and the second application object are displayed in the second electronic device. The corresponding synchronization unit 50 of the projection processing device may be further configured to, if the first electronic device selects the first application object from the plurality of application objects managed by the task manager, project the third display content generated by the application program corresponding to the first application object in the operative state to the second display area of the display area of the second electronic device in real-time for display.

That is, if the first electronic device determines the first application object of the plurality of application objects managed by the task manager as the current to-be-projected application object, the first electronic device may continue to display the content of the first application object in the display area of the second electronic device for display. The display content of the first application object may change as the first application object operation runs. After the first application object is determined as the to-be-projected application object again, the first electronic device may project the third display content generated by the application program corresponding to the first application object in the operative state to the second display area of the display area of the second electronic device in real-time for display. Thus, the content displayed in the second electronic device may change as the first application object runs in the first electronic device.

In some embodiment, another method of controlling the first application object and the second application object may include the following processes. If the first electronic device projects the second display content generated by the application program corresponding to the second application object in the operative state to the second display area of the display area of the second electronic device in real-time for display, the first electronic device may control the first application object to be in the forbidden projection status. Thus, during displaying the second application object in the second electronic device, the operation body may drag the first application object back, and the first electronic device may control the first display content of the first application object to be displayed in the display area of the first electronic device. As such, while switching the display content of the second electronic device, the first electronic device may further control the status change of the application object.

The projection processing device may further include the control unit, which may be configured to control the first application object to be maintained in the lock operative state. The lock operative state may indicate that during synchronizing the first display content to the second electronic device, the task manager may be forbidden to close the first application object. That is, when the task manager performs the object close operation, the other application objects except for the first application object of the plurality of application objects managed by the task manager may be closed. However, the first application object may be still in the operative state.

The determination unit 40 may be further configured to, during synchronizing the first display content to the display area of the second electronic device for display, determining the third application object from the plurality of application objects. The display 30 may be further configured to display the fourth display content displayed in real-time when the third application object is in the operative state in the display area of the first electronic device. Thus, the task manager may be used as the entrance for the display contents of the first electronic device and the second electronic device. The first electronic device and the second electronic device may display different application objects independently to avoid the mutual impacts between the first electronic device and the second electronic device.

After determining the first application object, the determination unit 40 may be further configured to set the first application object as the first object in the management queue of the task manager. Thus, after calling the task manager, the first electronic device may display the first application object in the display area first.

In projecting the application object of the task manager to the second electronic device for display, in addition to project the application object to the second electronic device, the first electronic device may also cancel the projection of the application object. The units of the corresponding projection processing device are further configured to perform the following processes.

The acquisition unit 10 may be further configured to obtain the cancel projection operation of the operation body for the first application object.

The response unit 20 may be further configured to respond to the cancel projection operation to synchronize the content currently displayed in the display area of the first electronic device to the display area of the second electronic device for display. The content displayed in the display area of the second electronic device may be replaced through the cancel projection operation. The contents displayed in the first electronic device and the second electronic device may be synchronized through the cancel projection operation.

A method of obtaining the cancel projection operation of the operation body for the first application object may include obtaining the selection operation of the operation body for the first application object. The operation body may move in a second direction when maintaining the selection operation. If detecting the release selection operation during the movement in the second direction, the first electronic device may determine to obtain the cancel projection operation.

Another method of obtaining the cancel projection operation of the operation body for the first application object may include obtaining the selection operation of the operation body for the first application object. The operation body may move in the first direction when maintaining the selection operation. When the operation body moves for the second distance in the first direction, the display area of the first electronic device may display the plurality of control elements related to the first application object. When the operation body continues to move in the first direction from the position where the second distance is, the first electronic device may control the operation status of at least one control element of the plurality of control elements. If the first electronic device detecting the release selection operation during the movement in the first direction, and the control elements related to the projection of the plurality of control elements are in the forbidden status, the first electronic device may determine to obtain the cancel projection operation.

For the two processes of canceling the projection operation, reference may be made to the description in method embodiments, which is not repeated here.

Embodiments of the present disclosure further provide an electronic device including a processor, a screen, and a communication module. The processor may be configured to obtain the call operation for the electronic device and respond to the call operation to call the task manager of the electronic device to display the plurality of application objects managed by the task manager in the display area of the screen. The processor may be further configured to determine the first application object from the plurality of application objects and s project a first display content generated by an application program corresponding to the first application object in an operative state to the display area of another electronic device in real-time for display through the communication module.

The communication module may include, but be not limited to, a wired communication module and a wireless communication module. With the communication module, the electronic device and another electronic device may be connected through at least one of a wired connection manner or a wireless connection manner, for example, through a DP cable or an HDMI cable. For another example, the electronic device and the another electronic device may be connected to the same LAN. Because the stability of the wired connection manner is better than the wireless connection manner, the electronic device and the another electronic device may be connected through the wired connection manner. If the electronic device and the another electronic device are connected through the wired connection manner and the wireless connection manner. Data may be transmitted through the wired connection manner.

The relationship between the electronic device and the another electronic device may include, but be not limited to, the following relationship. The display area of the another electronic device may be larger than the display area of the electronic device. Thus, the display content of an application object that requires a large display area may be projected to the display area of the another electronic device. In addition, the another electronic device may include an electronic device having a display function but not a computation ability. For example, the another electronic device may include a monitor. The another electronic device may not include an input element such as a mouse or a keyboard. The another electronic device may be controlled through the input element of the electronic device. Computation required by the control may be processed by the electronic device. The electronic device may transmit the content displayed in real-time obtained after the processing to the another electronic device for display.

Embodiments of the present disclosure may further provide a storage medium. The storage medium may store computer program codes that, when executed, cause the processor to implement the screen projection processing method and/or the control method.

Embodiments in this specification may be described in a progressive manner. The features described in embodiments of the specification may be replaced or combined with each other. Each embodiment focuses on the differences from other embodiments. The same or similar parts between embodiments may be referred to each other. For device embodiments, since device embodiments are basically similar to method embodiments, the description is relatively simple. For related parts, please refer to a portion of the description of method embodiments.

In this specification, relational terms such as first and second are only used to distinguish one entity or operation from another entity or operation and do not necessarily require or imply any such actual relationship or order between these entities or operations. Moreover, the terms "including," "containing," or any other variations thereof are intended to cover non-exclusive inclusion, so that an item or a device including a series of processes, methods, articles, or devices of the elements includes not only those elements, but also other elements that are not explicitly listed, or elements inherent to such processes, methods, articles, or devices. If there are no more restrictions, the element defined by the sentence "including a" does not exclude the existence of another same element in the item or device that includes the processes, methods, articles, or devices of the above elements.

The foregoing description of the disclosed embodiments enables those skilled in the art to implement or use the present disclosure. Various modifications to these embodiments are obvious to those skilled in the art. The general principles defined herein may be implemented in another embodiment without departing from the spirit or scope of the present disclosure. Therefore, the present disclosure is not be limited to embodiments shown in this specification, but should conform to the widest scope consistent with the principles and novel features disclosed in the present disclosure.

The above are only some embodiments of the present disclosure. Those of ordinary skill in the art, without departing from the principles of the present disclosure, several improvements and modifications may be made, and these improvements and modifications should be within the scope of the present disclosure.

What is claimed is:

1. A screen projection processing method, comprising:
obtaining an operation for a first electronic device;
responding to the operation by calling a task manager of the first electronic device to display a plurality of application objects managed by the task manager in a display area of the first electronic device;
determining a first application object from the plurality of application objects;
projecting a first display content generated by an application program corresponding to the first application object in an operative state to a display area of a display area of a second electronic device in real-time;
determining a second application object from the plurality of application objects;
projecting a second display content generated by an application program corresponding to the second application object in an operative state to the display area of the second electronic device in real-time to replace the first display content displayed in the display area of the second electronic device; and
in response to selecting the first application object from the plurality of application objects managed by the task manager, projecting a third display content generated by the application program corresponding to the first application object in the operative state to the display area of the second electronic device in real-time.

2. A projection processing device comprising:
a processor; and
a storage medium storing computer program codes that, when executed, cause the processor to:
before a projection instruction is received or a projection function is activated:
obtain an operation for a first electronic device;
respond to the operation by calling a task manager of the first electronic device;
display a plurality of application objects managed by the task manager in a display area of the first electronic device, the plurality of application objects managed by the task manager including a plurality of application objects used by the first electronic device in a predetermined period; and
determine a first application object from the plurality of application objects; and
after the first application object is determined, project a first display content generated by an application program corresponding to the first application object in an operative state to a display area of a second electronic device in real-time.

3. The device of claim 2, wherein the computer program codes further cause the processor to:
obtain a selection operation for an application object of the plurality of application objects, the selection operation being activated and moved in a first direction;
in response to detecting a release of the selection operation, determine to obtain a projection operation; and
respond to the projection operation to determine the application object corresponding to the selection operation as the first application object.

4. The device of claim 3, wherein the computer program codes further cause the processor to:
in response to moving the selection operation for a first distance in the first direction, display a plurality of control elements related to the application object corresponding to the selection operation in the display area of the first electronic device; and
during a process of continuing to move the selection operation in the first direction from a position where the first distance is, control an operation status of a control element of the plurality of control elements;
in response to detecting the release of the selection operation and a control element related to projection of the plurality of control elements being in an available status, determine to obtain the projection operation.

5. The device of claim 2, wherein the computer program codes further cause the processor to:
determine a second application object from the plurality of application objects; and
project a second display content generated by an application program corresponding to the second application object in an operative state to the display area of the second electronic device in real-time.

6. The device of claim 5, wherein the computer program codes further cause the processor to:
project the first display content to a first display area of the display area of the second electronic device; and project the second display content to a second display area of the display area of the second electronic device.

7. The device of claim 5, wherein the computer program codes further cause the processor to:
replace the first display content displayed in the display area of the second electronic device with the second display content; and
project a third display content generated by an application program corresponding to the first application object in the operative state to the display area of the second electronic device in real-time.

8. The device of claim 2, wherein the computer program codes further cause the processor to:
control the first application object to remain in a lock state, the lock state instructing of forbidding to close the first application object through the task manager during projecting the first display content to the second electronic device.

9. The device of claim 2, wherein the computer program codes further cause the processor to:
during projecting the first display content to the display area of the second electronic device, determine a third application object from the plurality of application objects; and
display a fourth display content generated by an application program corresponding to the third application object in an operative state to in the display area of the first electronic device in real-time.

10. The device of claim 2, wherein the computer program codes further cause the processor to:
set the first application object as a first object in a management queue of the task manager to display the first application object first in the display area of the first electronic device after the task manager is called.

11. A screen projection processing method, comprising:
before a projection instruction is received or a projection function is activated:
obtaining an operation for a first electronic device;
responding to the operation by calling a task manager of the first electronic device to display a plurality of application objects managed by the task manager in a display area of the first electronic device, the plurality of application objects managed by the task manager including a plurality of application objects used by the first electronic device in a predetermined period; and
determining a first application object from the plurality of application objects; and
after the first application object is determined, projecting a first display content generated by an application program corresponding to the first application object in an operative state to a display area of a second electronic device in real-time.

12. The method of claim 11, further comprising:
receiving a selection operation selecting an application object from the plurality of application objects, the selection operation being activated and moved in a first direction; and
in response to detecting a release of the selection operation, determining to obtain a projection operation;
wherein determining the first application object from the plurality of applications objects includes:
responding to the projection operation to determine the application object corresponding to the selection operation as the first application object.

13. The method of claim 12, further comprising:
in response to moving the selection operation for a first distance in the first direction, displaying a plurality of control elements related to the application object corresponding to the selection operation in the display area of the first electronic device; and
during a process of continuing to move the selection operation in the first direction from a position where the first distance is, controlling an operation status of a control element of the plurality of control elements;
wherein in response to detecting the release of the selection operation, determining to obtain the projection operation includes:
in response to detecting the release of the selection operation and a control element related to projection of the plurality of control elements being in an available status, determining to obtain the projection operation.

14. The method of claim 11, further comprising:
determining a second application object from the plurality of application objects; and
projecting a second display content generated by an application program corresponding to the second application object in an operative state to the display area of the second electronic device in real-time.

15. The method of claim 14, wherein projecting the second display content generated by the application program corresponding to the second application object in the operative state to the display area of the second electronic device in real-time includes:
projecting the first display content to a first display area of the display area of the second electronic device; and
projecting the second display content to a second display area of the display area of the second electronic device.

16. The method of claim 14,
wherein projecting the second display content generated by the application program corresponding to the second application object in the operative state to the display area of the second electronic device in real-time includes:
replacing the first display content displayed in the display area of the second electronic device with the second display content;
the method further comprising:
in response to selecting the first application object from the plurality of application objects managed by the task manager, projecting a third display content generated by an application program corresponding to the first application object in the operative state to the display area of the second electronic device in real-time.

17. The method of claim 11, further comprising:
controlling the first application object to remain in a lock state, the lock state disabling closing the first application object through the task manager during projecting the first display content to the second electronic device.

18. The method of claim 11, further comprising:
during projecting the first display content to the display area of the second electronic device in real-time, determining a third application object from the plurality of application objects; and
displaying a fourth display content generated by an application program corresponding to the third application object in an operative state in the display area of the first electronic device in real-time.

19. The method of claim 11, further comprising:
  setting the first application object as a first object in a management queue of the task manager to display the first application object first in the display area of the first electronic device after calling the task manager.

* * * * *